US009722973B1

(12) United States Patent
Kothari et al.

(10) Patent No.: US 9,722,973 B1
(45) Date of Patent: *Aug. 1, 2017

(54) SYSTEM AND METHOD TO ANONYMIZE DATA TRANSMITTED TO A DESTINATION COMPUTING DEVICE

(71) Applicant: Ciphercloud, Inc., San Jose, CA (US)

(72) Inventors: Pravin Kothari, San Jose, CA (US); Debabrata Dash, San Jose, CA (US)

(73) Assignee: CIPHERCLOUD, INC., San Jose, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 13/939,577

(22) Filed: Jul. 11, 2013

Related U.S. Application Data

(63) Continuation-in-part of application No. 13/843,925, filed on Mar. 15, 2013, now Pat. No. 9,292,696, which is a continuation-in-part of application No. 13/042,459, filed on Mar. 8, 2011, now Pat. No. 8,694,646, and a continuation-in-part of application No. 13/323,821, filed on Dec. 13, 2011, now Pat. No. 8,726,398.

(51) Int. Cl.
*H04L 29/06* (2006.01)
(52) U.S. Cl.
CPC ................ *H04L 63/0428* (2013.01)
(58) Field of Classification Search
USPC .......... 726/22, 2, 21, 26; 713/150, 163, 181; 380/255, 264, 276
See application file for complete search history.

(56) References Cited

U.S. PATENT DOCUMENTS

| | | | | |
|---|---|---|---|---|
| 2006/0129545 | A1* | 6/2006 | Golle | G06F 21/6245 |
| 2007/0043730 | A1* | 2/2007 | Wisely | G06F 17/30864 |
| 2008/0148407 | A1* | 6/2008 | Katkar | G06F 21/566 |
| | | | | 726/24 |
| 2010/0036959 | A1* | 2/2010 | Trace | H04L 29/12066 |
| | | | | 709/228 |
| 2014/0025999 | A1* | 1/2014 | Kessler | G06F 11/0754 |
| | | | | 714/43 |
| 2014/0053244 | A1* | 2/2014 | Raman | G06F 21/6263 |
| | | | | 726/4 |

* cited by examiner

*Primary Examiner* — Farid Homayounmehr
*Assistant Examiner* — Sharif E Ullah
(74) *Attorney, Agent, or Firm* — Minisandram Law Firm; Raghunath S. Minisandram

(57) ABSTRACT

A method and system for a distributed anonymization system is disclosed. A master anonymization system is provided. A slave anonymization system is configured to communicate with the master anonymization system, wherein the master anonymization system permits the slave anonymization system to perform one or more functions. The slave anonymization system is configured receives a request from a user computer that requires slave anonymization system to perform a function. The performance of the function requires either storage of data to a data store in a destination computing device or retrieval of data from the data store in the destination computing device, wherein the data is stored or retrieved in an anonymized form. The slave anonymization system verifies if the function to be performed is a permitted function. If it is a permitted function, the function is performed.

26 Claims, 17 Drawing Sheets

| ITERATION | INPUT | RANGE OF CHARACTERS |
|---|---|---|
| 0 | x | ABCDEFGHIJKLMNOPQRSTUVWXYZ |
| 1 | 0 | ABCDEFGHIJKLMNOPQRSTUVWXYZ |
| 2 | 1 | ABCDEFGHIJKLMNOPQ |
| 3 | 1 | DEFGHIJKLMNOPQ |
| 4 | 0 | FGHIJKLMNOPQ |
| 5 | 0 | FGHIJ |
| 6 | x | FGH |

FIG.6C

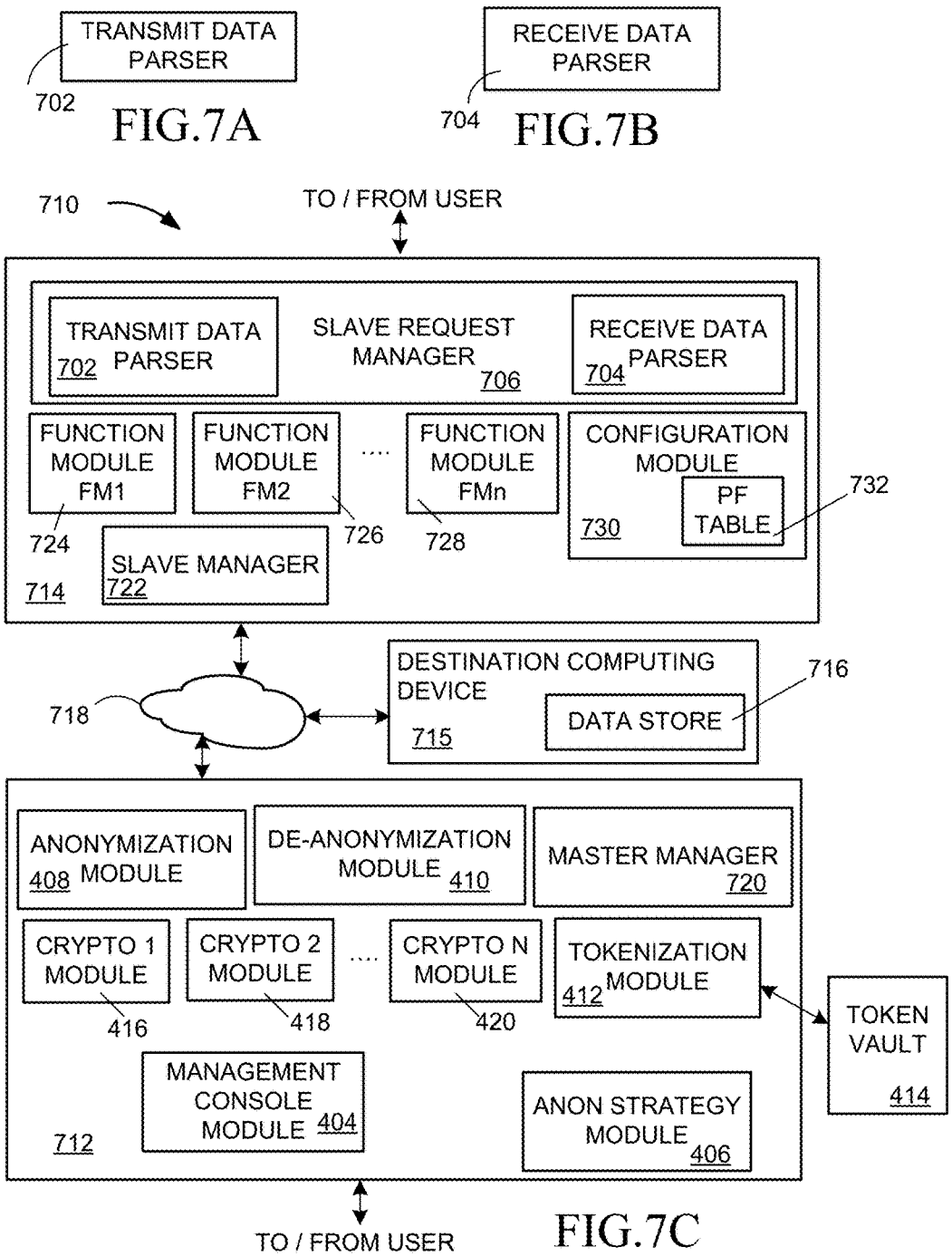

| APP- SA0 | ANONYMIZE | DE-ANONYMIZE | SELECTIVE DE-ANONYMIZE | FUNCTION MODULE |
|---|---|---|---|---|
| DATA FIELD 1 | YES | YES | YES | FM1 |
| DATA FIELD 2 | NO | NO | YES AGGREGATE | |
| DATA FIELD 3 | NO | NO | NO | |
| DATA FIELD 4 | NO | NO | YES AGGREGATE | FM2 |
| DATA FIELD 5 | NO | YES | YES | |
| DATA FIELD 6 | NO | NO | NO | |
| DATA FIELD 7 | NO | NO | YES AGGREGATE | FMn |
| DATA FIELD 8 | NA | NA | NA | |

FIGURE 7D

POST ACTION WITHOUT ANONYMIZATION

_CONFIRMATIONTOKEN=D_50pD0Su2DOuFvjle8LLJqm.GsZ_1o9A5xyMTUhEgGRHn1_wLcw1A534jF8R_fsMpDZEiz
ZnR.gLnzEuTQW_OcdKSvBVZUvsOPAqV.MzcOg7f8ZXpfu6MniAFOb.BVW8kln.ONoK9MuDte_lnYJAv7kSmg%3D&ca
ncelURL=%2F001C000000n6wyJ&id=001C000000n6wyJ&retURL=%2F001C000000n6wyJ&save_new_url=%2F001%2Fe%
3FretURL%3D%252F001C000000n6wyJ&save=Saving...&acc10=&acc2=Test+Account+1&acc11=&acc3_lkid=0000000000
00000&acc3_lkold=null&acc3_lktp=001&acc3_lspf=0&acc3_lspfsub=0&acc3_mod=0&acc3_&acc6=&acc15=&acc
7=&acc8=&acc20=&acc17street=&acc18city=&acc18state=&acc17zip=&acc18zip=
&acc17country=&acc18country=&sysMod=12da5ed4b20

POST ACTION WITH ANONYMIZATION

_CONFIRMATIONTOKEN=D_50pD0Su2DOuFvjle8LLJqm.GsZ_1o9A5xyMTUhEgGRHn1_wLcw1A534jF8R_fsMpDZEizZnR.g
LnzEuTQW_OcdKSvBVZUvsOPAqV.MzcOg7f8ZXpfu6MniAFOb.BVW8kln.ONoK9MuDte_lnYJAv7kSmg%3D&cancelURL=%
2F001C000000n6wyJ&id=001C000000n6wyJ&retURL=%2F001C000000n6wyJ&save_new_url=%2F001%2Fe%
3FretURL%3D%252F001C000000n6wyJ&save=Saving...&acc10=&acc2=TPF1Kakgfkoja1TSF+TPF1Bmhaehkddfama1TSF+1
&acc11=&acc3_lkid=000000000000000&acc3_lkold=null&acc3_lktp=001&acc3_lspf=0&acc3_lspfsub=0&acc3_mod=0&acc3=&a
cc12=&acc6=&acc15=&acc7=&acc8=&acc20=&acc17street=&acc18city=&acc17state=&acc18state=&a
cc17zip=&acc18zip=&acc17country=&acc18country=&sysMod=12da5ed4b20

GET ACTION RESPONSE FROM HOSTED CLOUD

```
...
<tr class="dataRow even last first">
<th scope="row" class="dataCell">
<a href="/001C000000n6wyJ">TPF1Kakgfkoja1TSF TPF1Bmhaehkddfama1TSF 1</a>
</th>
...
</tr>
...
```
                904                                          906

GET ACTION RESPONSE TO USER COMPUTER

908
```
...
<tr class="dataRow even last first">
<th scope="row" class="dataCell">
<a href="/001C000000n6wyJ">Test Account 1</a>
</th>
...
</tr>
...
```
                                                             910

SYSTEM AND METHOD TO ANONYMIZE DATA TRANSMITTED TO A DESTINATION COMPUTING DEVICE

CROSS-REFERENCE TO RELATED APPLICATIONS

This application is a continuation-in-part of application Ser. No. 13/843,925 filed on Mar. 15, 2013, which is a) a continuation-in-part of application Ser. No. 13/042,459 filed on Mar. 8, 2011 and b) a continuation-in-part of application Ser. No. 13/323,821 filed on Dec. 13, 2011. Application Ser. No. 13/843,925 filed on Mar. 15, 2013 is incorporated herein by reference in its entirety. Application Ser. No. 13/042,459 filed on Mar. 8, 2011 is incorporated herein by reference in its entirety. Application Ser. No. 13/323,821 filed on Dec. 13, 2011 is incorporated herein by reference, in its entirety.

TECHNICAL FIELD

The present invention relates generally to transmitting data to and retrieving data from a destination computing device and particularly, to anonymize data transmitted to the destination computing device and de-anonymize data retrieved from the destination computing device.

DESCRIPTION OF RELATED ART

The Internet has enabled computer users all over the world to interact, communicate, store and access information electronically. One particularly popular mode for running applications over the internet is to host application on a server located in a remote location, along with data associated with the applications. The users of the application access the application and associated data over the internet. Sometimes, this mode of running applications in a remote location is referred to as cloud computing. It is not uncommon for the application to be hosted on a server owned or controlled by a third party. And, various clients or users of the application run the application hosted on the server at the third party location and store data corresponding to the application on a data storage device, for example, a database running on a computing device at the third party location.

There are multiple benefits of using a third party hosted application to a client. For example, the application may be managed by subject matter experts who are familiar with the application, for example a customer relationship management (CRM) application. Sometimes, ancillary applications and resources needed to provide best in class application may be made available to all the clients of the application. The third party may be able to allocate resources based on varying or seasonal demands of each of its customers.

As more and more enterprises or customers use applications hosted at third party locations, the data associated with the enterprise may need to be protected from unauthorized access. Some of the data security requirements may be imposed by regulatory bodies. Some of the data security requirement may be client specific.

As more and more applications are hosted at the third party locations and corresponding data is stored at the third party locations, there is a need to find efficient ways to provide data security to the data stored at the third party locations. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method for anonymizing data to ne transmitted to a destination computing device is provided. A communication link between a master anonymization system and a slave anonymization system is provided. Master anonymization system permits slave anonymization system to perform one or more functions. Data to be transmitted to a destination computing device from a user computer is received by the slave anonymization system. The data includes a plurality of fields of data. One of the fields of data is selected for anonymization. If anonymizing selected one of the fields of data is a permitted function is verified. If so, the selected one of the fields of data is anonymized and transmitted to the destination computing device.

In yet another embodiment, an anonymization system to anonymize data transmitted to a destination computing device is disclosed. The system includes a master anonymization system and a slave anonymization system configured to communicate with master anonymization system. The master anonymization system permits the slave anonymization system to perform one or more functions. The slave anonymization system is configured to receive data to be transmitted to the destination computing device from a user computer, the data including a plurality of fields of data. The slave anonymization system selects one or more fields of data for anonymization, verifies if anonymization of the selected fields of data is a permitted function. If so, the slave anonymization system anonymizes the selected fields of data and transmits the data with anonyized field of data to the destination computing device.

In yet another embodiment, a distributed anonymization system is disclosed. The system includes a master anonymization system and a slave anonymization system configured to communicate with master anonymization system. The master anonymization system permits the slave anonymization system to perform one or more functions. The slave anonymization system is configured to receive a request from a user computer that requires slave anonymization system to perform a function, the performance of the function requires either storage of data to a data store in a destination computing device or retrieval of data from the data store in the destination computing device, wherein the data is stored or retrieved in an anonymized form. The slave anonymization system verifies if the function to be performed is a permitted function and performs the function if it is a permitted function.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 4 and 4A show an exemplary block diagram of an anonymization system, according to one aspect of the present disclosure;

FIG. 6C shows an exemplary table 650 showing various iterations of the decoding operation of the searchable encryption system of FIG. 6A, according to one aspect of the present disclosure.

FIG. 7A shows an exemplary transmit data parser, according to one aspect of the present disclosure;

FIG. 7B shows an exemplary receive data parser, according to one aspect of the present disclosure;

FIG. 7C shows an exemplary distributed anonymization system, according to one aspect of the present disclosure;

FIG. 7D shows an exemplary permitted function table of distributed anonymization system of FIG. 7C, according to one aspect of the present disclosure;

FIGS. 8A-8D shows exemplary anonymization of data transmitted to a destination computing device;

DETAILED DESCRIPTION

To facilitate an understanding of the adaptive aspects of the present invention, the general architecture and operation of a networked system is described. The specific architecture and operation of the adaptive aspects of the present disclosure are then described with reference to the general architecture.

Figure 1A:
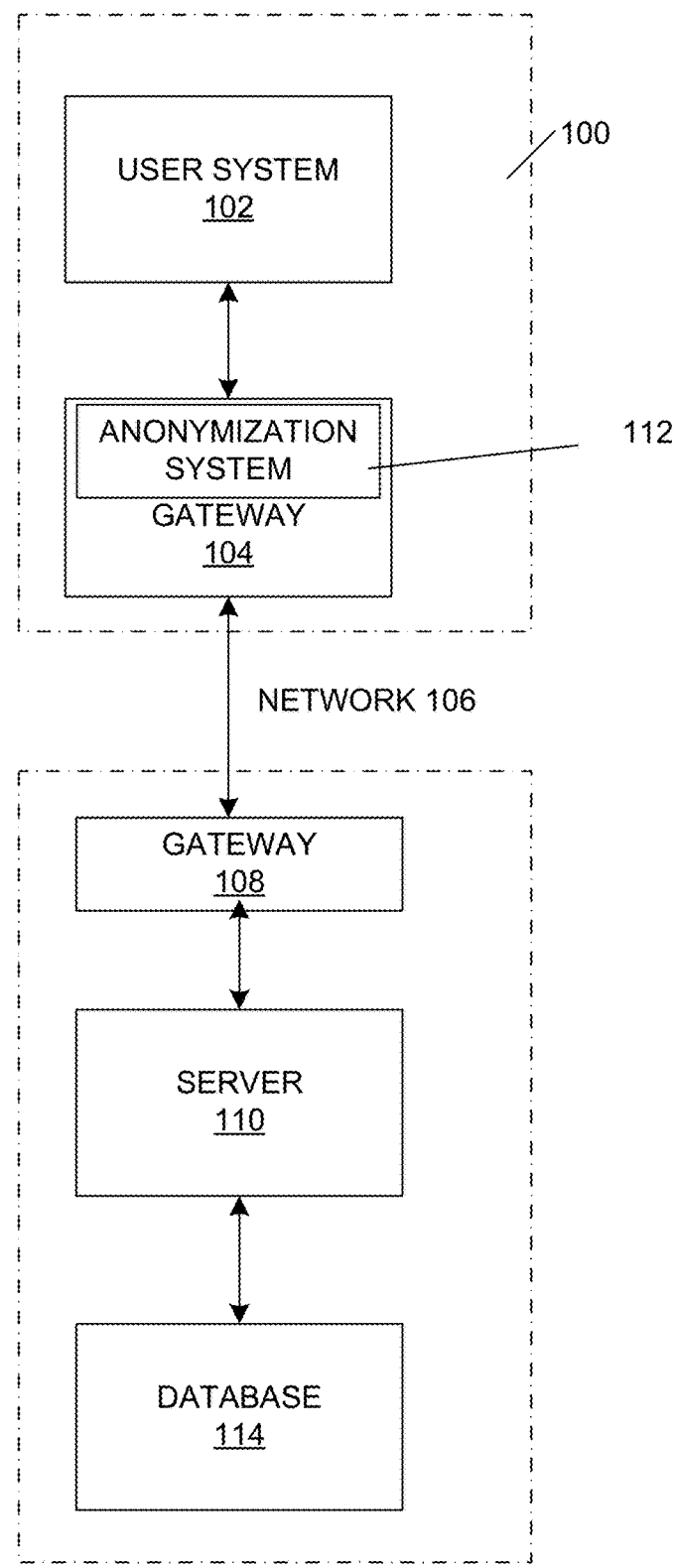
FIG. 1A shows a block diagram of a system with anonymization system of the present disclosure used to process requests from a user system to an application server, according to one aspect of the present disclosure.

FIG. 1A shows a top-level block diagram of a system 100 with anonymization system of this disclosure that is used to send data from a user system, according to one aspect of the present disclosure. System 100 includes a user system 102 that is coupled via a gateway 104 and a network connection 106 to a server 110 through another gateway 108. In one aspect, server 110 is a web-server. Gateway 104 in one embodiment includes an anonymization system 112 of this disclosure. Database 114 is used to store information that is accessed by the user system 102. In one aspect, database 114 is a structured query language (SQL) based database.

Figure 1B:
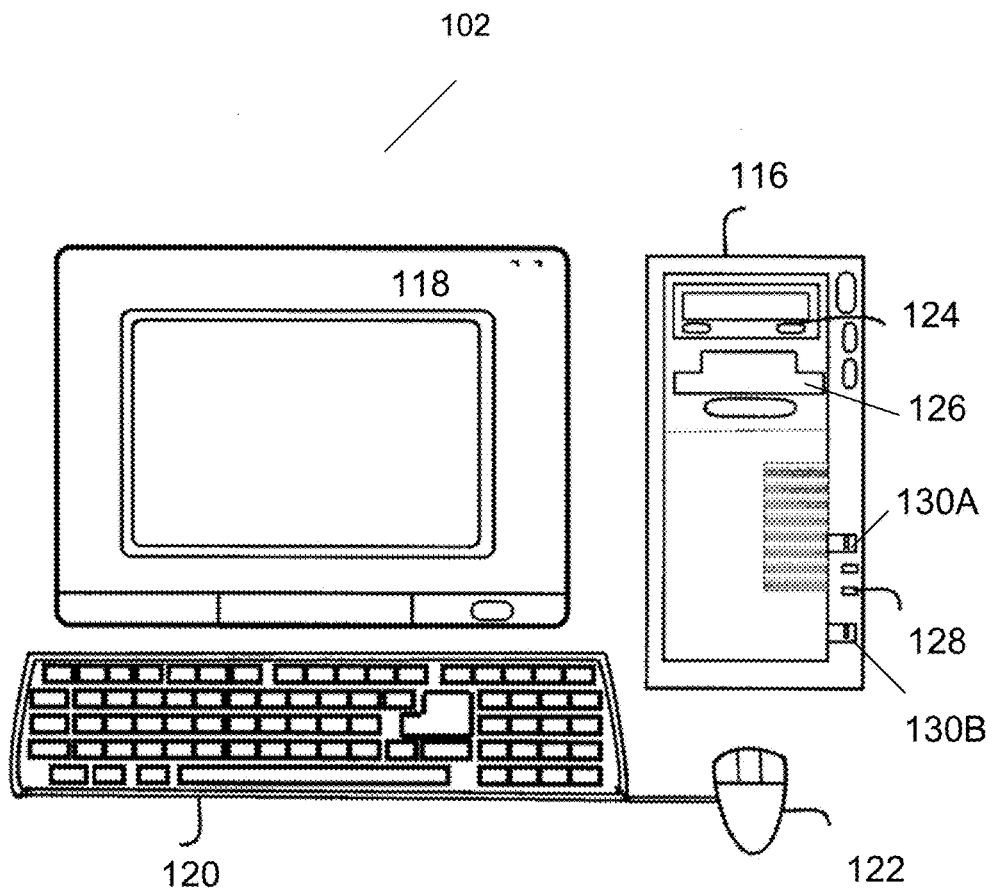
FIG. 1B shows a block diagram of the user system of FIG. 1 configured to communicate with a server over the network, according to one aspect of the present disclosure.

FIG. 1B is a block diagram of a user system 102 according to one embodiment of the present disclosure, which is configured to communicate with the server 110 over the network. FIG. 1B includes a user computer 116 (sometimes referred to as computer 116) and a monitor 118. Monitor 118 may be a CRT type, a LCD type, a plasma type, or any other type of color or monochrome display. Also provided with computer 116 is a keyboard 120 for entering text data and user commands, and a pointing device 122 (such as a mouse) for processing objects displayed on monitor 118. In some embodiments, objects displayed on monitor 118 may be elements of a graphical user interface.

Computer 116 may include a computer-readable memory medium such as a rotating disk 124 for storing readable data. Besides other programs, disk 124 can store application programs including web browsers by which computer 116 connects to a network and the systems described below, according to one aspect of the present disclosure. In some embodiments, disk 124 may be a disk system with a plurality of disk drives arranged as a Redundant Array of Inexpensive Drives (RAID) system, accessible using a storage adapter (not shown).

Computer 116 can also access a computer-readable storage device 126 with removable storage media storing data files, application program files, and computer executable process steps embodying the present invention or the like. For example, the storage device 126 may be a CD-ROM or a DVD ROM. In some embodiments, the storage device 126 may support removable storage media that is read-only device (R), write once-read many (WORM), or rewriteable (RW) type. In some embodiments, the storage device 126 may also be provided with computer 116 to access application program files, audio files and data files stored on a removable storage media. In some embodiments, the removable storage media may be optical, magnetic, magneto-optic, or semiconductor based recording media.

A modem, an integrated services digital network (ISDN) connection, wireless or the like also provides computer 116 with a DSL/Cable/satellite/wireless (or Internet connection) 128 to the World Wide Web (WWW). Internet connection 128 allows computer 116 to send and receive commands, data files, audio files, application program files and computer-executable process steps embodying the present invention.

Computer 116 is also provided with external audio speakers 130A and 130B to assist a listener to listen to music either downloaded on-line from the Internet or off-line using a storage medium. It is noteworthy that a listener may use headphones instead of audio speakers 130A and 130B to listen to music.

Figure 2:
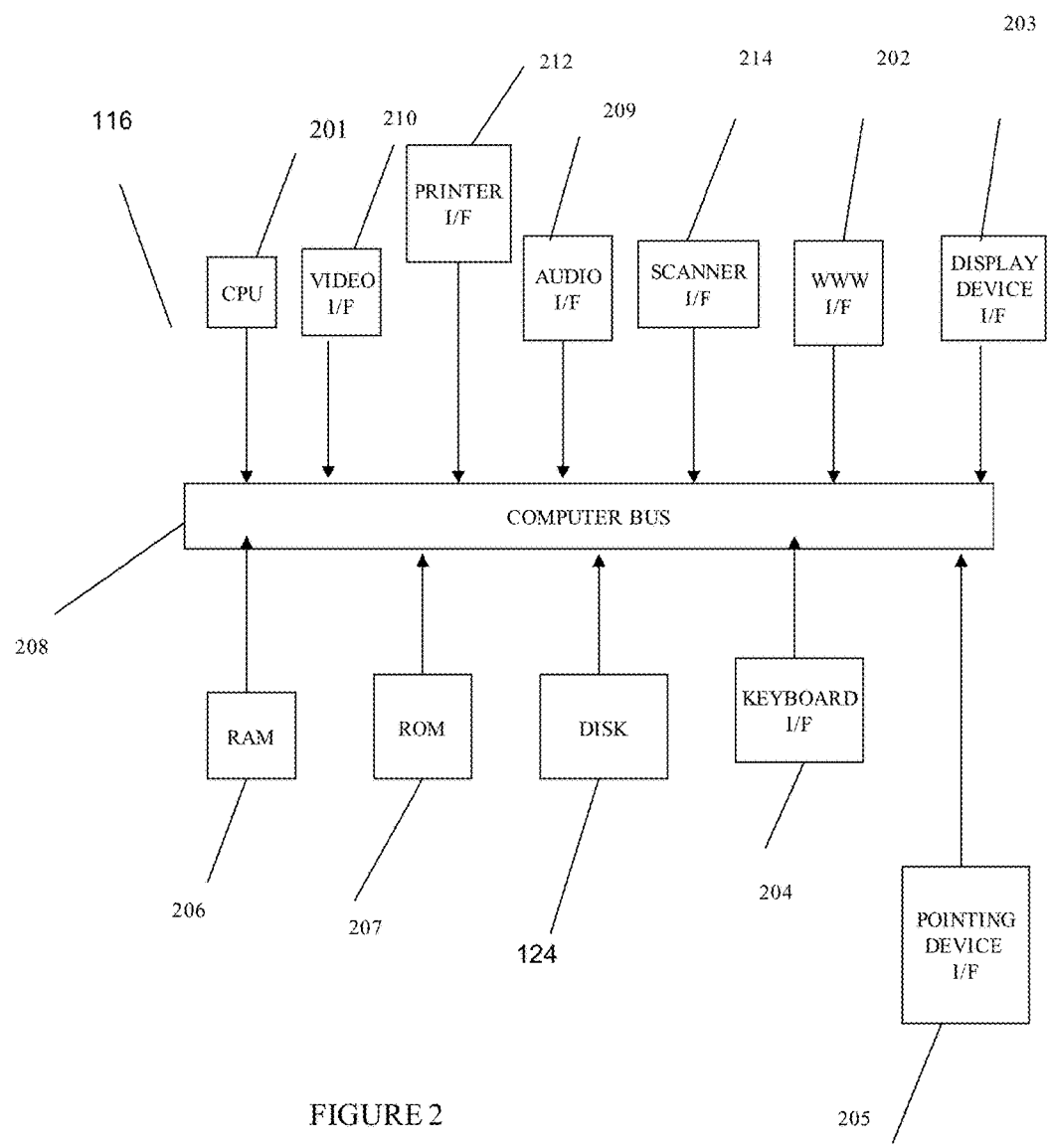
FIG. 2 shows a block diagram of the internal functional architecture of a user computer, according to one aspect of the present disclosure.

FIG. 2 is a block diagram showing the internal functional architecture of computer 116. As shown in FIG. 2, computer 116 includes a central processing unit (CPU) 201 for executing computer-executable process steps and interfaces with a computer bus 208. Also shown in FIG. 2 are a WWW interface 202, a display device interface 203, a keyboard interface 204, a pointing device interface 205, an audio interface 209, video interface 210, printer interface 212, and a disk 124. Audio Interface 209 allows a listener to listen to music, Online (downloaded using the Internet or a private network) or offline (using a CD).

As described above, disk 124 may store operating system program files, application program files, web browsers, and other files. Some of these files are stored on disk 124 using an installation program. For example, CPU 201 executes computer-executable process steps of an installation program so that CPU 201 can properly execute the application program.

A random access main memory ("RAM") 206 also interfaces to computer bus 208 to provide CPU 201 with access to memory storage. When executing stored computer-executable process steps from disk 124 (or other storage device such as storage device 126 or Internet connection 128), CPU 201 stores and executes the process steps out of RAM 206.

Read only memory ("ROM") 207 is provided to store invariant instruction sequences such as start-up instruction sequences or basic input/output operating system (BIOS) sequences for operation of keyboard 120.

Figure 2A:
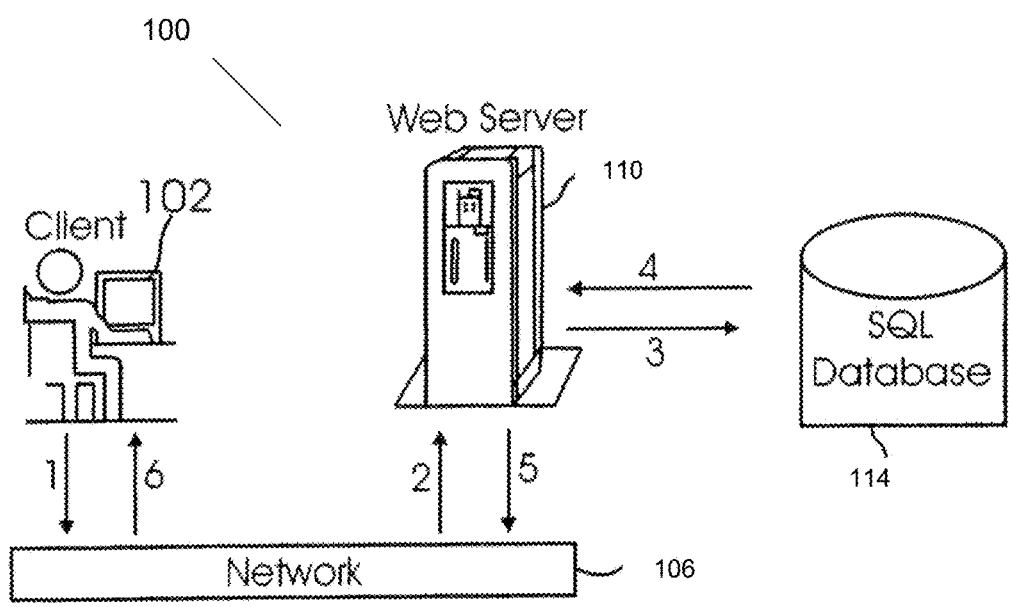
FIG. 2A shows a block diagram of another embodiment of a system used to service requests from a user computer, according to another aspect of the present disclosure.

FIG. 2A shows yet another example of the overall system 100, according to one aspect of the present disclosure. In FIG. 2A, server 110 is shown as a web server and database 114 is shown as a SQL (structured query language) database. FIG. 2A also shows the various steps that are used to access database 114. In step 1, a user using a browser running on the user system 102, submits a URL, as a request. URL includes the application to which the request is directed. In step 2, the web server 110 captures the request, and locates and executes corresponding application specific program (ASP) code for the application to which the request was directed.

In step 3, during execution of ASP code, a structured query language (SQL) code is generated and executed. Based on the executed SQL code, database 114 is accessed to fetch, add, modify or delete information in the database.

In step 4, the results are sent to the web server 110. The web server 110 constructs a response, for example as a HTML code. In step 5, HTML code is sent to the user system 102. In step 6, the HTML page is sent to the browser and displayed on the user system 102.

Although in this example, a user submits a URL as a request, in some embodiments, a user application executing on the user computer 102 may submit a request. The request may be submitted as a URL, and the user application may be configured to receive the response to the request.

Figure 3:
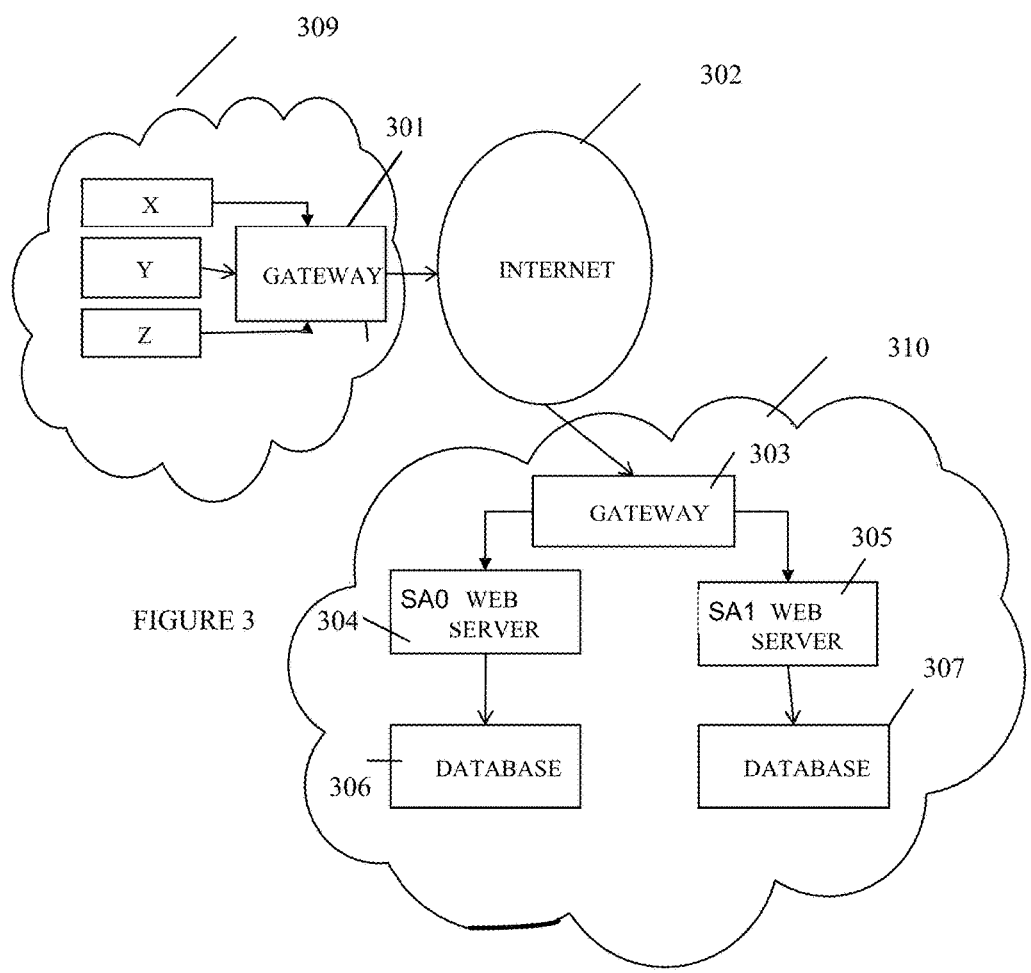
FIG. 3 shows an exemplary topology of computer network coupling user computers to servers over the internet, according to one aspect of the present disclosure.

Now, an exemplary coupling of the computer 116 to a server over the internet will be described with reference to FIG. 3. FIG. 3 shows an exemplary topology of a computer network with computers similar to computer 116, connected to the Internet 302. For illustration purposes, three computers X, Y and Z are shown connected to the Internet 302 via Web interface 202 through a gateway 301, where gateway 301 can interface N number of computers. Gateway 301 may be similar to gateway 104 with an anonymization system 112. Web interface 202 may be a modem, network interface card or a unit for providing connectivity to other computer systems over a network using protocols such as X.25, Ethernet or TCP/IP, or any device that allows, directly or indirectly, computer-to-computer communications. Gateway 301 and computers X, Y and Z may be located or controlled within a user controlled environment. This user controlled environment may be within the user controlled enterprise or intranet. For convenience, gateway 301 and computers X, Y and Z are grouped together and referred to as user cloud 309. Exemplary topology of a computer network may have additional groups of computers with gateway to define additional user clouds. In one embodiment, data flow outside the user cloud may need special handling.

It is noteworthy that the invention is not limited to a particular number of computers. Any number of computers can be connected to the Internet 302 or any other computer network may be used.

FIG. 3 further shows a second gateway 303 that connects a network of web servers 304 and 305 to the Internet 302. Web servers 304 and 305 may be connected with each other over a computer network. Web servers 304 and 305 receive requests from the user computer and respond to the requests received from the user computer. Web server 304 is coupled to a database 306 and web server 305 is coupled to a database 307. In one embodiment, the web server may be hosting an application for use by the user computer. As an example, web server 304 is hosting server application SA0 and web server 305 is hosting server application SA1. As one skilled in the art appreciates, server applications may be a hosted customer relationship management software (CRM) application, a website, online shop, news service, search applications, social networking applications, blog sites, webmail and the like.

In one embodiment, the gateway 303, servers 304 and 305, and databases 306 and 307 may be hosted at a third party location. For convenience, gateway 303, servers 304 and 305, and databases 306 and 307 are grouped together and referred to as hosted cloud 310. Exemplary topology of a computer network may have additional groups of servers with gateways and databases to define additional hosted clouds.

The following provides a brief description of the Internet. The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A web browser is a software program that allows users to access the content stored in Web sites. Modern Web browsers can also create content "on the fly", according to instructions received from a Web site. This concept is commonly referred to as "dynamic page generation". In addition, browsers can commonly send information back to the Web site, thus enabling two-way communication of the user and the Web site. A user can connect to the Internet via a proprietary network, such as America Online, or via an Internet Service Provider, e.g., Earthlink. The web browser may run on any computer connected to the Internet. Currently, various browsers are available of which two prominent browsers are Microsoft Internet Explorer and Mozilla Firefox. The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Web domain is an Internet address that provides connection to a Web server. Generally, URLs have three parts: the first part describes the protocol used to access the content pointed to by the URL, the second contains the directory in which the content is located, and the third contains the file that stores the content: <protocol>:<domain><directory><file>.

For example:
http://www.ciphercloud.com/bios.html
http://www.ciphercloud.com/index.html
http://fn.cnn.com/archives/may2009/pr3.html
ftp://user1.ciphercloud.com/software/pages.zip Commonly, the <protocol> part may be missing. In that case, modern Web browsers access the URL as if the http://prefix was used. In addition, the <file> part may be missing. In that case, one of the convention calls for the file "index.html" to be fetched. In some cases, the request may be redirected to fetch another default file.

For example, the following are legal variations of the previous example URLs:
www.ciphercloud.com/bios.html
www.ciphercloud.com
fn.cnn.com/archives/may2009/pr3.html
ftp://user1.ciphercloud.com/software/pages.zip Web Page.

Web page is the content associated with a URL. In its simplest form, this content is static text, which is stored into a text file indicated by the URL. However, very often, the content contains multi-media elements (e.g. images, audio, video, etc) as well as non-static text or other elements (e.g. news tickers, frames, scripts, streaming graphics, etc). Very often, more than one file forms a Web page. However, there is only one file that is associated with the URL and which initiates or guides the Web page generation.

When a Web browser receives an URL, the Web browser requests a Domain Name System (DNS) name server to decode the domain name and return the IP address for the domain name. The DNS name server returns the IP address of the domain name as stored in the DNS name server to the web browser. Web browser uses the IP address for the domain name and sends a request corresponding to the requested URL that confirms to the HTTP protocol to the IP address. In one embodiment, the request is sent using TCP/IP protocol over the internet.

In one embodiment, the user computer 116 sends requests to the server using HTTP protocol. As previously described with reference to FIG. 2A, the request is processed by the web server and a response is sent to the user computer. In the exemplary topology described with reference to FIG. 3, the request is sent over the internet to the server. In some embodiment, requests may be sent using Hypertext Transfer Protocol Secure (HTTPS) protocol, which is a combination of HTTP protocol with SSL/TLS protocol to provide encrypted communication and secure identification of a network web server.

Figure 4:
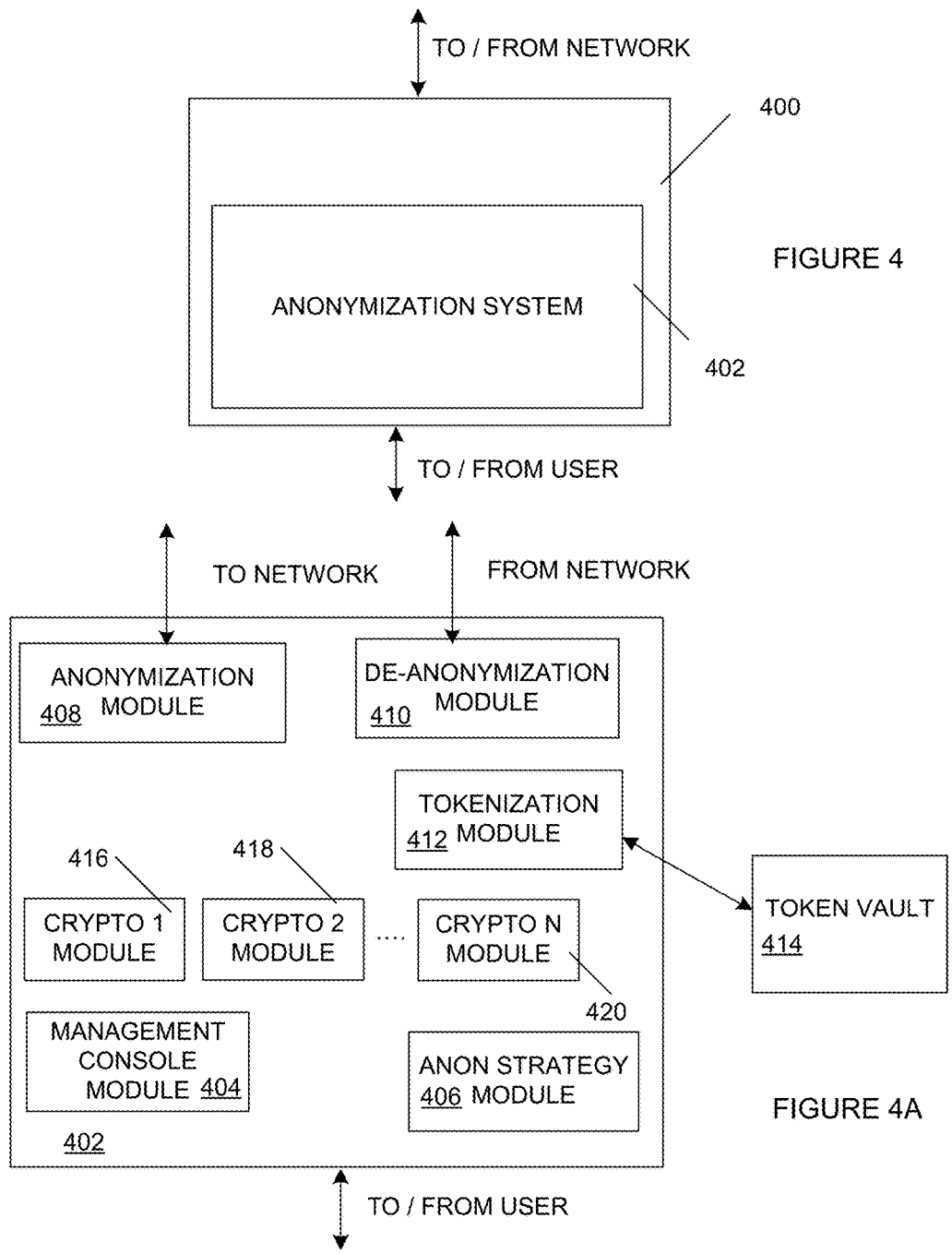

Now, one embodiment of an anonymization system 402 is described with reference to FIG. 4. Anonymization system 402 may be similar to anonymization system 112. FIG. 4 shows the anonymization system 402 as part of gateway 400 that connects to the network, but the anonymization system 402 can be provided in other ways, such as software running on a server, distributed software, or various software and hardware packages operating together. In one embodiment, the anonymization system 402 may be part of the gateway described with reference to FIG. 1A and FIG. 3. The gateway 400 is configured to communicate with the user systems within the user cloud and communicate with the hosted cloud over the network. The anonymization system 402 will be described in detail, with reference to FIG. 4A.

Now referring to FIG. 4A, the anonymization system 402 includes a management console module 404, an anonymization strategy module 406, anonymization module 408, de-anonymization module 410, tokenization module 412 and one or more crypto modules, shown as crypto 1 module 416, crypto 2 module 418 and crypto N module 420. Additionally, a token vault 414 is also part of the anonymization system 402. As one skilled in the art appreciates, various modules referenced in this disclosure may be implemented in hardware, software executed on a computing device or a combination of hardware and software. Additionally, various modules may be implemented as an integrated unit or may be implemented as separate functional units that interact with each other using a communication protocol.

The management console module 404 is configured to communicate with various applications running on the hosted cloud, over the network. Additionally, the management console module 404 is also configured to communicate with the user computer. For example, the management console module 404 may send queries to various applications running on the hosted cloud and receive meta data (or data schema, data definitions) of each application.

The management console module 404 may also present the received meta data information about the applications running on the hosted cloud to the user. The management console module 404 may additionally present the available anonymization strategies for each data field of the meta data to the user computer. The user may select one or more of the anonymization strategies to be applied to various data fields of the application, using the user computer.

The selected anonymization strategy is stored by the management console module 404 in the anonymization strategy module 406, for later use by other modules of the anonymization system 402. The anonymization strategy may be stored as a table in the anonymization strategy module 406. The anonymization strategy in one embodiment may include schema definition for data manipulation. An exemplary selected anonymization strategy will be described later with reference to FIG. 5.

The anonymization module 408 is configured to intercept any data to be transmitted from a user computer to the hosted cloud. The anonymization module 408 is also configured to communicate with the anonymization strategy module 406 and evaluate various fields of data to be transmitted against anonymization strategy stored in the anonymization strategy module 406. Based upon this evaluation, the anonymization module 408 is configured to perform anonymization of one or more data fields using one or more of the tokenization module 412 and crypto modules, for example, crypto1 module 416 and crypto 2 module 418 and generate corresponding anonymized data field.

The anonymization module 408 is also configured to reassemble the data to be transmitted to the hosted cloud, using the anonymized data fields. In one embodiment, the reassembled data includes one or more unique data pattern added to the anonymized data fields to indicate the selected anonymization strategy used to anonymize the data fields. In one embodiment, a preamble is appended to the beginning of the anonymized data field. In one embodiment, a postamble is appended to the end of the anonymized data field. The reassembled data is forwarded to the hosted cloud over the network using the gateway 400. Various functions and features of the tokenization module 412 and crypto modules will be described later.

The de-anonymization module 410 is configured to intercept any data received by the user computer from the hosted cloud. The de-anonymization module 408 is also configured to evaluate various fields of data received from the hosted cloud to detect and decode the preamble and postamble of the data fields. Based upon this evaluation, the de-anonymization module 410 is configured to perform de-anonymization of one or more data fields using one or more of the tokenization module 412 and crypto modules, for example, crypto1 module 416 and crypto 2 module 418 and generate corresponding de-anonymized data field. The de-anonymization module 410 is also configured to reassemble the data to be transmitted to the user computer, using the de-anonymized data fields. The reassembled data is forwarded to the user computer.

Figure 5:
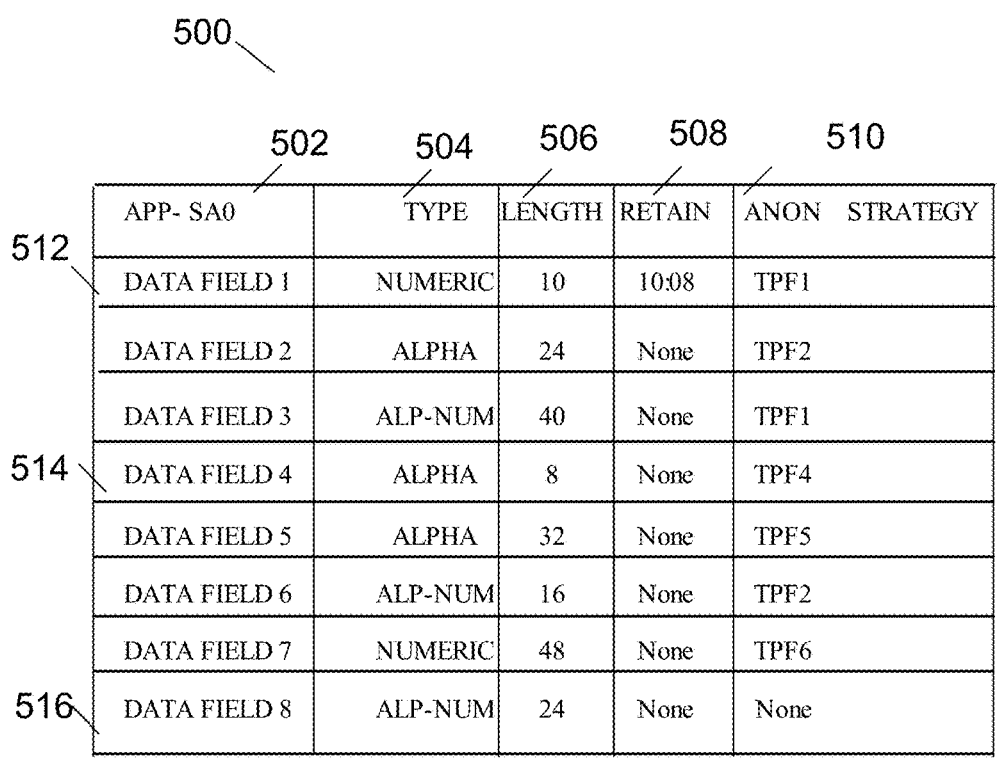
FIG. 5 shows an exemplary anonymization strategy data table, according to one aspect of the present invention.

Now, referring to FIG. 5, an exemplary anonymization strategy data table 500 for server application SA0 stored by the anonymization strategy module 406 is described. As one skilled in the art appreciates, the anonymization strategy data may be stored in other forms other than a table form. Column 502 shows various data fields of server application SA0. Each of the rows of table 500 shows the data field and their corresponding characteristics. As an example, Column 504 shows data type for each of the data fields, for example numeric, alphabetical or alpha-numeric characters. Column 506 shows the length of the data field. Column 508 shows whether any portion of the data field needs to be retained as originally provided by the user computer. Column 510 shows the selected anonymization strategy for each of the data fields.

Now referring to row 512, various attributes of DATA FIELD 1 is stored in table 500. For example, DATA FIELD 1 is a numeric field of length 10 characters. Characters 8 through 10 of DATA FIELD 1 needs to be retained in its original form. The selected anonymization strategy for DATA FIELD 1 is TPF1. For example, DATA FIELD 1 may be a telephone number and characters 10:08 may represent the area code of the telephone number and may have to be maintained in its original form at the hosted cloud. However, characters 07:01 will be anonymized using anonymization strategy TPF1. In one embodiment, TPF1 may correspond to anonymization using tokenization module 412. In one embodiment, TPF1 may correspond to anonymization using Crypto 1 module 416. In one embodiment, a preamble indicative of TPF1 anonymization strategy may be appended to the anonymized DATA FIELD 1.

Now referring to row 514, various attributes of DATA FIELD 4 is stored in table 500. For example, DATA FIELD 4 is an alphabetic field of length 8 characters. No characters need to be retained in its original form. The selected anonymization strategy for DATA FIELD 4 is TRF4. In one embodiment, TRF4 may correspond to anonymization using crypto 2 module 418. In one embodiment, TRF4 may correspond to anonymization using crypto N module 420. In one embodiment, a preamble indicative of TRF4 anonymization strategy may be appended to the anonymized DATA FIELD 4.

Now referring to row 516, various attributes of DATA FIELD 8 is stored in table 500. For example, DATA FIELD 8 is an alpha-numeric field of length 24 characters. No characters need to be retained in its original form. The selected anonymization strategy for DATA FIELD 8 is none. Based on this selection, no anonymization of DATA FIELD 8 will be performed and the data contained in DATA FIELD 8 will be sent in its original form.

Now various anonymization techniques implemented in various anonymization modules like tokenization module 412 and crypto modules like crypto 1 module, crypto 2 module and the like will be described. The anonymization technique selected for a data field may be based upon multiple factors. One of the factors is level of desired security. One of the other factors is data attribute preservation for the data field. The data attribute preservation refers to retaining capabilities to perform operations on the stored data field in their anonymized form as compared to the stored data in its original or clear form. Some of the operations that may be performed on the stored data field in their anonymized form include sorting in the order of their clear data form (or original data form), searching, searching regardless of the case of the characters, searching using partial string match or wild card match. As one skilled in the art appreciates, as more data attributes are preserved in the stored data form, in some embodiments, it may lead to decreased level of data security. Clear data or original data refers to the data as present in the data field before anonymization.

Anonymization techniques may be broadly divided into two categories. One, a token based anonymization. The token based anonymization may be implemented in the tokenization module 412 and may require local storage of the tokens in the token vault 414. Another technique is to use a symmetric key encryption based anonymization. Symmetric key encryption based anonymization technique may be implemented in one or more of the crypto modules, for example, crypto module 1, crypto module 2 and the like. Now, various anonymization techniques for each of the token based anonymization and symmetric key encryption based techniques will be described.

Token Based Anonymization Techniques:

Random token anonymization: In this technique, for data contained in each data field, a corresponding token is created. The token vault 414 is used to store the relationship between the original or clear data and the corresponding token. The token is sent to the hosted cloud, after prepending a preamble indicative of the type of anonymization performed on the data field. When the data field is retrieved from the hosted cloud, based on the preamble indicative of the type of anonymization performed, the token is used to extract the corresponding clear data stored in the token vault 414. The de-anonymized data is then forwarded to the user computer.

Sortable token anonymization: In this technique, the token vault is organized in a balanced, ordered tree, with each node representing a specific token that corresponds to a specific clear data. For an input data, the tokenization module 412 looks up the tree in the token vault 414 for a node that has not been used for clear data corresponding to the input data and establish a new token that corresponds to the input data. The new token is mapped to the input data. The new token in the selected node maintains the order of the tree. In this way, the token continues to maintain the order that corresponds to the original or clear data. The order may correspond to the position, sequence, or value of the original data. For example, the order may be based on alphabetical sequence, numerical sequence, value of the characters based on an assigned value or value of the characters based on a pre-assigned value, for example, Unicode value. The new token is then sent to the hosted cloud.

Token anonymization that allows case-insensitive search: In one embodiment, for each data, two tokens are generated. One, based on the original or clear form of the data and the other based on all lower cases. In one embodiment, random token anonymization technique is used, as described above. Both of the generated tokens are sent to the hosted cloud, with the token corresponding to all lower case is stored in a hidden field in the application.

When a search request is received for this field from the user computer, for example, as a keyword in clear form, search request is generated by the anonymization system 402, for both the clear form and all lower case. For example, anonymized keywords are generated, one based on the keyword in its original form and another based on keyword with all lower cases. The search request is then sent to the host cloud, with anonymized keyword for both clear form and all lower case. In one embodiment, the search request is sent with an "OR" logic so as to receive search results for both the keywords. Any results of the search received from the host cloud for both the anonymized keyword for clear form and anonymized keyword for all lower case will then be de-anonymized by the de-anomymization module of the anonymization system. The de-anonymized results are then presented to the user computer. As one skilled in the art appreciates, a keyword received in a search request may be full data field, few characters of a data field or few characters with a wild card. Principles described herein will work for all of these cases, as the search request sent to the host cloud will be based on anonymized keyword.

Symmetric Key Encryption Techniques:

AES encryption per word, with hard coded salt: In this technique, the data field values are broken down into words. Each of the word is encrypted using AES encryption using a hard coded salt. This technique will generate same encrypted data for the same input data, for each encryption cycle. The encrypted data is stored in the hosted cloud. A search word for exact match may be issued by the user computer to the hosted cloud. Corresponding encrypted data for the search word is generated by the anonymization system and sent to the hosted cloud. Any hits for exact match is returned to the anonymization system by the hosted cloud. The hits for exact match are then de-anonymized by the de-anonymization module 410 and presented to the user computer.

AES encryption per word, with hard coded salt that allows case-insensitive search: In one embodiment, for each word, two encrypted data words are generated. One, based on the original or clear form of the data word and the other based on all lower case of the data word. In one embodiment, AES encryption with hardcoded salt anonymization technique is used, as described above. Both of the generated anonymized data are sent to the hosted cloud, with the anonymized data corresponding to all lower case is stored in a hidden field in the application. When a search request is received for this field from the user computer, search request is generated by the anonymization system 402, for both the anonymized data words and sent to the host cloud. In one embodiment, the search request is sent with an "OR" logic so as to receive search results for both the encrypted words. Any results of the search received from the host cloud by the anonymization system will then be de-anonymized and presented to the user computer.

Searchable encryption: In this technique, encryption algorithm is designed to encrypt words of text. The encrypted values preserve the properties of sorting and equality of the clear values. As an example, the equality can be either case-sensitive or case-insensitive. As another example, sorting may be either case-sensitive or case-insensitive. In one embodiment, accented characters may be treated as equal characters. i.e. a character "E" and "É" may be treated as equal or same. In one embodiment, accented characters may be treated as adjacent characters, with "É" positioned after "E". Some of these techniques may permit both order preserving property for the anonymized data and case-insensitive search capability. Exemplary searchable encryption to encode words of a text will now be described with reference to FIGS. 6A-6B.

Figure 6A:
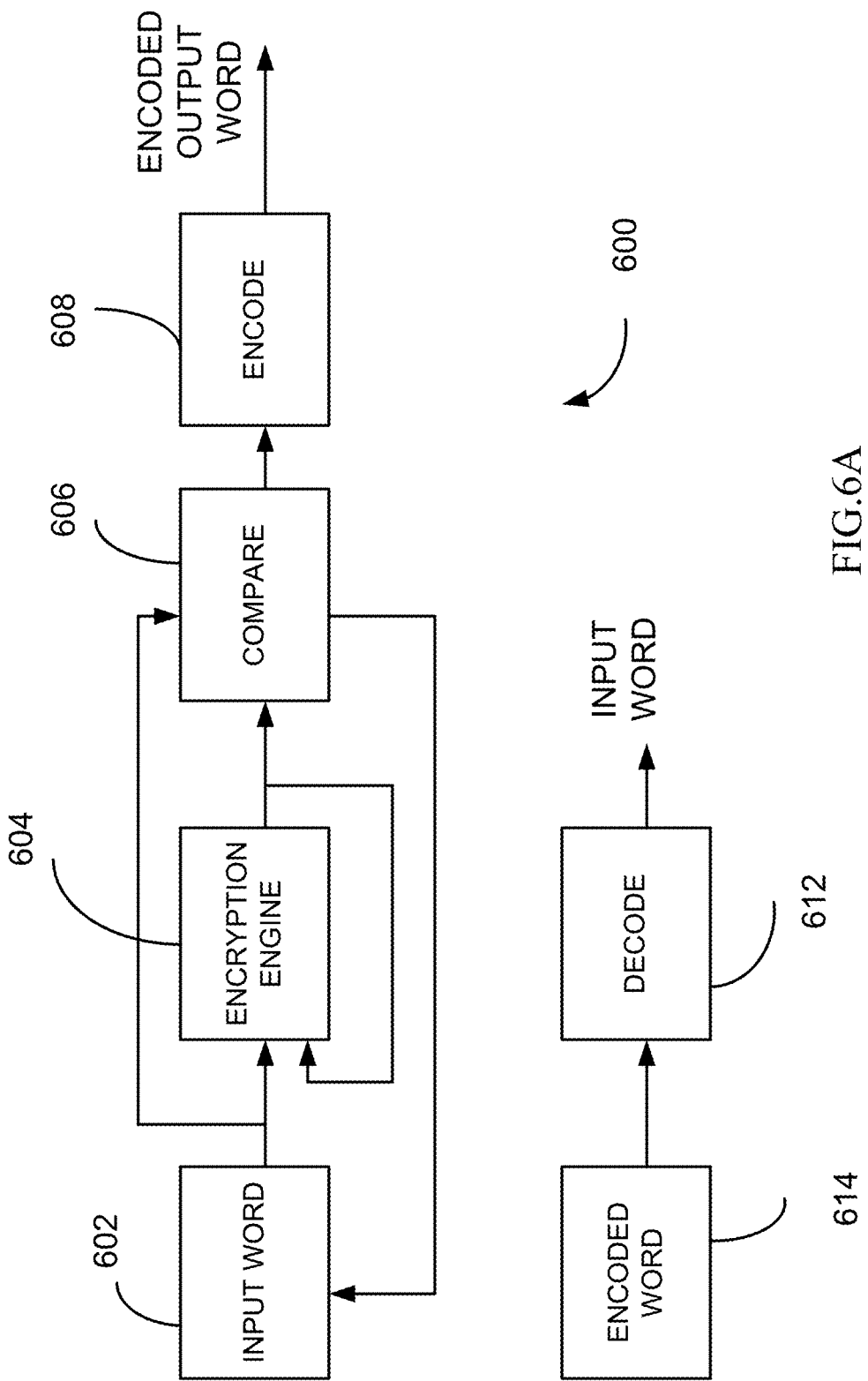
FIG. 6A shows an exemplary block diagram of a searchable encryption system, according to one aspect of the present disclosure.

FIG. 6A shows an exemplary block diagram of a searchable encryption system 600. The searchable encryption system 600 may be implemented in the anonymization system 402. The searchable encryption system 600 includes an input logic 602 to receive input word to be encrypted, an encryption engine 604, a compare logic 606 and an encode logic 608. Various elements of the encryption system 600 may be implemented in various functional modules of the anonymization system 402, for example, in the anonymization module 408, crypto modules 416-418, de-anonymization module 410 and the like. For example, the encryption engine 604 may be part of one of the crypto modules 416-420.

The input logic 602 is configured to receive the input word to be fed to the encryption engine 604. In one embodiment, the encryption engine 604 receives each of the characters of the input word and generate a random character as an output. The encryption engine 604 may include a Pseudo-Random Number Generation Algorithm (PRNG) to generate a random character as an output. The PRNG is preferably secure and is fast. One exemplary PRNG may be a RC4 cipher. In one embodiment, the generated random character will be within a predefined range of characters, which narrows in subsequent iterations, as will be described later.

The output of the encryption engine 604 is fed to the compare logic 606. The compare logic 606 is also configured to receive the corresponding input character as an input. The compare logic 606 is configured to compare generated output character of the encryption engine 604 with the corresponding input character in a first range of characters and generate a binary bit, based on whether the input character is higher in position or lower in position relative to the generated output character. As an example, a bit 0 is generated if the position is lower and a bit 1 is generated, if the position is higher relative to the generated output character. The generated output character is now fed as input to the encryption engine 604 to generate a second generated output character, within a second range of characters.

The second generated output character is again compared with the input character by the compare logic 606 and generate next bit of output based on the position of the input character relative to the second generated output character, within the second range of characters (which is smaller than the first range). The operation is repeated to generate additional output bits until the range is such that there are only two characters before or after the input character. Now, the next character of the input word is processed to generate second set of output bits. This operation will be further described with reference to FIG. 6B with table 620.

Figure 6B:
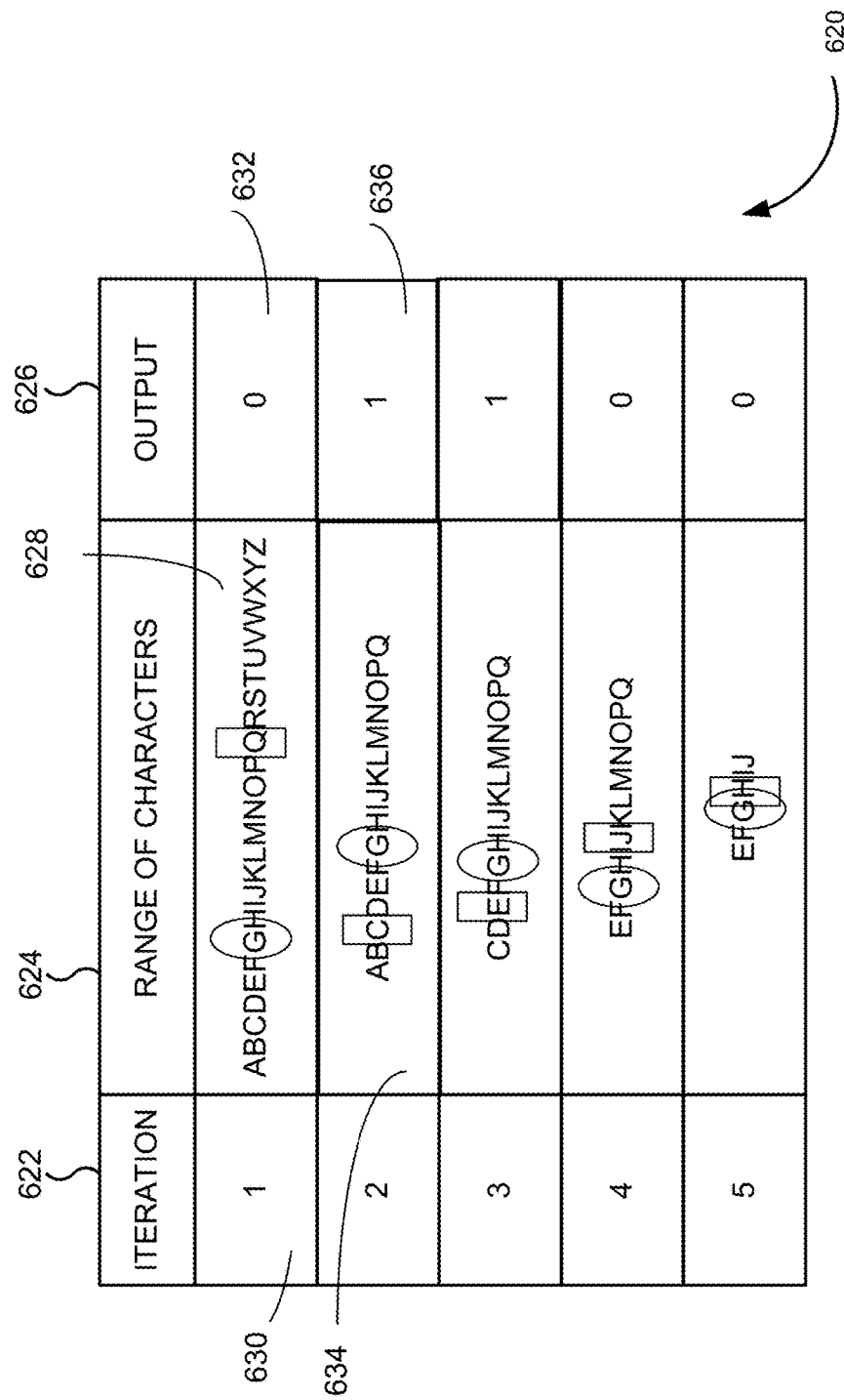
FIG. 6B shows an exemplary table 620 showing various iterations of the encoding operation of the searchable encryption system of FIG. 6A, according to one aspect of the present disclosure.

Referring to FIG. 6B, table 620 shows for each iteration in column 622, the corresponding character range in column 624 and the output of the compare logic for each iteration in column 626. For simplicity, only words with uppercase characters will be described. For example, if the word to be encoded is "GOLD", initial encoding starts with encoding the first character "G". The character G is fed to the encryption logic 604 as a first input character and the encryption logic 604 is configured to generate a random character as an output, for example, a random character between A-Z, which defines the first range of characters. Let us assume, the first generated random character output is Q.

Now, the first input character "G" is compared with the first generated random character output "Q" by the compare logic 606 to see if it is higher in position or lower in position relative to the first generated random character output, within the range shown in cell 628 which corresponds to the first iteration 630. In this case, as character G is lower in position to the first generated random character output Q, a binary value of "0" is output as the first bit of the encoded data, as shown in cell 632. Additionally, the first generated random character output Q defines the upper bound (as character Q is higher in position relative to character G) for the range of characters to be used in the next iteration, for example, second range of characters A-Q.

Next, the first generated random character output (in this case character "Q") is input to the encryption logic 604 and the encryption logic outputs a second generated random character output, within the second range of characters, as shown in cell 634. As one skilled in the art appreciates, the second range of characters is A-Q and the range of characters the encryption logic can output will be configured to be between A-Q. Let us assume, the second generated random character is character "C".

Now, the first input character is again compared with the second generated random character output to see if it is higher in position or lower in position relative to the second generated random character output. In this case, as character G is higher in position to the second generated random character output C, a binary value of "1" is output as the second bit of the encoded data, as shown in cell 636. Additionally, the second generated random character output C defines the lower bound (as character C is lower in position relative to character G) for the range of characters to be used in the next iteration, for example, third range of characters C-Q.

Now, the second generated random character output C is input to the encryption engine 604 and the encryption engine 604 outputs a third generated random character output. In this case, the third range of characters the encryption engine 604 can output is be configured to be within the third range of characters C-Q. Let us assume, the third generated random character is character "E", with a "1" assigned to the third bit of the encoded data, based on the comparison. Additionally, the third generated random character output E defines the lower bound (as character E is lower in position relative to character G) for the range of characters to be used in the next iteration, for example, fourth range of characters E-Q.

Similarly, referring to iteration 4, fourth generated random character is character "J" with an output of "0" as the forth bit of the encoded data, based on the comparison. Additionally, the fourth generated random character output J defines the upper bound (as character J is higher in position relative to character G) for the range of characters to be used in the next iteration, for example, fifth range of characters E-J.

Similarly, referring to iteration 5, the fifth generated random character is character "H", with a "0" assigned to the fifth bit of the encoded data, based on the comparison. This process is repeated until there are two or less characters left before and after the first input character, at which time, the encoding stops. So, in this case, as there are only two characters E and F before and one character J after the first input character G, the encoding stops. So, the final encoded output for character "G" is "00110".

The rest of the characters "O", "L" and "D" are similarly processed to get their corresponding encoded output. As an example, let the final encoded output for "GOLD" is 0100100010100101000000110. As one skilled in the art appreciates, depending upon the random character generated by the encryption engine 604, each character may have different number of bits as their encoded output. Now the final encoded output is transformed into a character representation, using an encode logic 608, which will be described now.

In one embodiment, the character representation of the final encoded output is done by splitting the final encoded output into a plurality of bits of data and assigning a unique character to each unique combination of a plurality of bits. As an example, four bits may be used to represent 16 different unique combinations, with each combination assigned a specific character. For example, a base-16 encoding may be used and sixteen characters, characters B-Q assigned to the base-16 encoded data. As an example, 0000 may be encoded as character B and 1111 may be encoded as character Q. With base-16 encoding, other characters may be available for assignment for special purposes or for padding. Other random assignments of characters to the base-16 encoded data are also possible. In some embodiments, dummy characters may be padded in the beginning and the end of the range, so that a lowest character in the character range will not encode as all zeros and highest character in the character range will not encode as all ones.

In one embodiment, in order to provide case insensitive search capability, the encoded output is mapped into lowercase characters, for example, characters b-q. Then, specific characters of the mapped word is capitalized, based on the capitalization of the original input word. For example, if the input word was Mom, and the final output is mapped into character combination "def", then, based on the capitalization of the original input word, the mapped character combination is modified to be "Def". A case sensitive and a case insensitive search on "mom" would return the appropriate results.

In some situations, the final encoded output may result in a mapped word that may have less characters than the original input word. As an example, for a three character input word, the encoded output may only generate two mapped characters. In such a situation, at least one character that is not used in the output mapping (as only 16 characters are used in a base-16 encoding) may be used as a padding character. Preferably, the padding character should sort before all other used characters. As an example, if the characters B-Q are used for mapping, character A may be used as a padding character to be added to the mapped characters. Character A would sort before the characters B-Q.

As an example, if the input of Mom mapped into "De", then with the added padding, the modified mapped characters will be Dea, which will have the same number of characters as the original input character. If the original input was "moM" and the input mapped into "De", then the modified mapped characters will be "deA", which preserves both the number of characters of the original input and the case of the characters of the original input.

In the above examples, only characters A-Z were considered. In order to expand the search and sortable encryption capabilities to characters outside the A-Z range, one or more escape characters may be pre-pended and/or post-pended to the input word. The escape character may indicate the characteristics of the word being encrypted. As an example, unique escape characters may be pre-pended to the input word to indicate if the input word is a character less than the number "0", numbers between 0-9, numbers greater than 9 but less than A, letters A-Z, single byte character greater than "Z", Unicode character in the range U+0080 to U+00FF, Unicode character in the range U+0100 to U+FFFF, Unicode character in the range U+10000 to U+10FFFF and the like. Additionally, a unique escape character may be post-pended to the input word to indicate "end of word".

As one skilled in the art appreciates, in one embodiment, the searchable encryption system 600 may additionally have a decode logic 612 to receive the encoded word 614 and output the decoded word character string. The decode logic 612 would receive the encoded characters of the encoded word as an input, perform the manipulation necessary to decode the encoded characters one character at a time and reassemble the encoded word as a decoded word. An exemplary decoding operation will be further described with reference to FIG. 6C with table 650.

Referring to FIG. 6C, table 650 shows for each iteration in column 652, the input bit 654 from the encoded word, corresponding character range in column 656. For simplicity, only decoding of character "G" of the encoded word will be described. For example, the character "G" was encoded as "00110". Iteration 0 refers to the initial set up of the range of characters, for example, first range of characters 658, which will be from A-Z. In iteration 1, the input bit is "0" and the input bit "0" is fed to the decode logic 612. The decode logic 612 generates first random range character Q as an output, based on the input bit of "0". Since input bit was a "0", character Q defines the upper bound for the next range of characters to be used in the decoding process. Now, the second range of characters 660 is defined to be from A-Q, based on the generated first random range character "Q".

Next, in iteration 2, next input bit of "1" is input to the decode logic 612. The decode logic 612 generates second random range character C as an output, based on the input bit of "1". As the input bit was a "1", character C+1 defines the lower bound for the next range of characters to be used in the decoding process. Now, the third range of characters 662 is defined to be from D-Q, based on the generated second random range character "C".

Next, in iteration 3, next input bit of "1" is input to the decode logic 612. The decode logic 612 generates third random range character E as an output, based on the input bit of "1". As the input bit was a "1", character E+1 defines the lower bound for the next range of characters to be used in the decoding process. Now, the fourth range of characters 664 is defined to be from F-Q, based on the generated third random range character "E".

Next, in iteration 4, next input bit of "0" is input to the decode logic 612. The decode logic 612 generates fourth random range character J as an output, based on the input bit of "0". As the input bit was a "0", character "J" defines the upper bound for the next range of characters to be used in the decoding process. Now, the fifth range of characters 666 is defined to be from F-J, based on the generated fourth random range character "J".

Next, in iteration 5, next input bit of "0" is input to the decode logic 612. The decode logic 612 generates fifth random range character H as an output, based on the input bit of "0". As the input bit was a "0", character "H" defines the upper bound for the next range of characters to be used in the decoding process. Now, the sixth range of characters 668 is defined to be from F-H, based on the generated fifth random range character "H".

Now, the fifth range of characters 668 is narrowed down to three characters, F, G and H. The middle character "G" is chosen as the decoded character for the encoded input word. Similarly, rest of the encoded input words are decoded to generate the original word "GOLD".

Anonymization of Data Communicated in Different Formats:

As previously discussed with reference to FIGS. 4 and 4A, the anonymization system 402 is configured to intercept any data to be transmitted from a user computer to the hosted cloud. More particularly, the anonymization module 408 is configured to intercept any data to be transmitted from a user computer to the hosted cloud. Various field of the intercepted data is evaluated against anonymization strategy stored in the anonymization strategy module 406. Based on the anonymization strategy, anonymization is performed and the data is reassembled and forwarded to the hosted cloud.

Similarly, the de-anonymization module 410 is also configured to intercept any data received by the user computer from the hosted cloud. The de-anaonymization module 408 is configured to evaluate various fields of data received from the hosted cloud, evaluate the fields and perform appropriate actions to de-anonymize one or more fields. The de-anonymization module 410 is also configured to reassemble the data to be transmitted to the user computer, using the de-anonymized data fields. The reassembled data is forwarded to the user computer.

Now, referring to FIG. 7A, a transmit data parser 702 is described. The transmit data parser 702 is configured to intercept or receive data to be transmitted from the user computer. The transmit data parser 702 is also configured to evaluate various field of data to be transmitted from the user computer. In one embodiment, the transmit data parser 702 is configured to determine the format of the data to be transmitted. For example, the transmit data parser 702 may be configured to determine if the data to be transmitted is configured as a query to a database, an e-mail message and the like. In one embodiment, based on the determination of the format, the transmit data parser 702 may also be configured to determine various fields in the data that may be subject to anonymization. Based on this determination, one or more fields of the data may be selected for anonymization.

The anonymization module 408 may then determine the anonymization strategy to be used to anonymize one or more selected fields of data. For example, the anonymization strategy to be used may be stored in the anonymization strategy module 406. After anonymization of one or more selected fields, the data is reassembled and forwarded to the hosted cloud. As the anonymization system 402 has determined the format for the data to be transmitted, the data is reassembled using the same format, as originally received. Reassembled data is then sent to the host cloud.

Now, referring to FIG. 7B, a receive data parser 704 is described. The receive data parser 704 is configured to intercept or receive data received from the host cloud. The receive data parser 704 is also configured to evaluate various field of data received from the host cloud. In one embodiment, the receive data parser 704 is configured to determine the format of the data received. For example, the receive data parser 704 may be configured to determine if the data received is configured as a response to query to a database, an e-mail message and the like. In one embodiment, based on the determination of the format, the receive data parser 704 may also be configured to determine various fields in the data that were subject to anonymization. Based on this determination, one or more fields of the data is selected for de-anonymization.

The de-anonymization module 410 may then de-anonymize the selected data field. After de-anonymization of one or more selected fields, the data is reassembled and forwarded to the user. As the de-anonymization system 410 has determined the format for the data received, the data is reassembled using the same format, as originally received. Reassembled data is then sent to the user.

As one skilled in the art appreciates, in one embodiment, the transmit data parser 702 may be implemented as part of the anonymization module 408. In yet another embodiment, the receive data parser 704 may be implemented as part of de-anonymization module 410. In some embodiments, the transmit data parser 702 and receive data parser 704 may be implemented as a single module, that communicates with the anonymization module 408 and de-anonymization module 410. In some embodiments, the transmit data parser 702 may be implemented as a separate module that communicates with the anonymization system 402. In some embodiments, the receive data parser 704 may be implemented as separate module that communicates with the anonymization system 402. For example, the transmit data parser 702 may be physically remote from the anonymization system 402 and communicates with the anonymization system 402 over a communication link. As another example, the receive data parser 704 may be physically remote from the anonymization system 402 and communicates with the anonymization system 402 over a communication link.

Now, various exemplary implementation examples utilizing the functions and features of the transmit data parser 702 and receive data parser 704 will be described.

For example, users interface with relational data base management systems through connectivity application programming interfaces (APIs) like Open Database Connectivity (ODBC) API or Java Database Connectivity (JDBC) API. These APIs query and manipulate the database using structured query language (SQL). As an example, when a user data is received by the anonymization system 402, the transmit data parser 702 evaluates the user data and determines the format of the user data. In this case, the transmit data parser determines that the format of the user data is a SQL command. The transmit data parser 702 then further evaluates various fields of data in the SQL command and identifies select fields for possible anonymization.

As an example, if the SQL command was of the type "insert values ('abc') into table", then the transmit data parser 702 selects the field with field value of 'abc" as a field for anonymization. The value 'abc' is then anonymized by the anonymization module 408. As an example, the value 'abc' is anonymized as 'xyz'. Then, the anonymization module 408 reassembles the SQL command as "insert values ('xyz') into table" and sends the modified SQL command to the host cloud.

As one skilled in the art appreciates, if a SQL command is sent to retrieve data from the host cloud, the response (received data) is received by the receive data parser 704. The receive data parser 704 will evaluate and determine the format for the received data, for example, as a response to a SQL command. Then, the receive data parser 704 identifies one or more fields that were anonymized. These anonymized fields are then de-anonymized by the de-anonymization module 410. The received response is reformatted with de-anonymized data and the response with clear data is sent to the user.

As yet another example, users or systems interface with mail servers and system using one or more interface or access protocols. Some of the mail protocols and interfaces that permit access to mail servers and systems are Internet Message Access Protocol (IMAP), Simple Mail Transfer Protocol (SMPT) and Messaging Application Programming Interface (MAPI).

In some embodiments, when a message is being sent by a user, the message is received by the anonymization system 402, for further processing. The anonymization system 402 may be configured to evaluate the message (sometimes referred to as "data" or "user data") for possible anonymization. As one skilled in the art appreciates, the user data may be in different format, to comply with one or more mail protocols or interfaces. In one embodiment, the transmit data parser 702 may evaluate the user data to determine the format of the user data. Based on determining the format of the data, the transmit data parser may further evaluate various fields of data in the user data and identifies select fields for possible anonymization.

The data in select fields of data identified by the transmit data parser 702 may be anonymized by the anonymization module 708, based on anonymization strategy stored in the anonymization strategy module 406. Then, the anonymization module 408 reassembles the user data based on the original format of the user data. The reassembled user data is then forwarded to the destination computing device or the host cloud.

As one skilled in art appreciates, in some embodiments, the user data may be initially forwarded by a mail server or a mail gateway to the anonymization system 402, for processing by the anonymization system 402. The reassembled user data may then be forwarded by the anonymization system 402 back to the mail server or mail gateway, for further processing.

In yet another embodiments, portions of the anonymization system 402 may be distributed in a mail gateway or server. In yet another embodiments, portions of the anonymization system 402 may be distributed in a client computing device used by a user. For example, portions of the transmit data parser 702 may be implemented in a client computing device where the e-mail message is generated. The transmit data parser 702 may then analyze the e-mail message, identify the format and select one or more data fields for anonymization. The data in the selected one or more fields for anonymization may then be forwarded to the anonymization system 402 for anonymization. The anonymization system 402 may then return the anonymized data back to the transmit data parser 702, for further processing. In some embodiments, transmit data parser 702 may reassemble the message with the anonymized data and forward the anonymized message for further processing.

As one skilled in the art appreciates, when a mail message is retrieved by a user, the received message may be sent to the anonymization system 402 for de-anonymization. The receive data parser 704 may determine the format of the mail message and identify one or more fields that were subject to anonymization. These identified fields may be processed by the de-anonymization module 406 to de-anonymize the identified field. The message is reformatted with de-anonymized data and the message is sent to the user.

As one skilled in the art appreciates, in yet another embodiments, portions of the anonymization system 402 may be distributed in a mail gateway or server. In yet another embodiments, portions of the anonymization system 402 may be distributed in a client computing device used by a user. For example, portions of the receive data parser 704 may be implemented in a client computing device where the e-mail message is received. The receive data parser 704 may then analyze the received e-mail message, identify the format and select one or more data fields that were anonymized, for deanonymization. The data in the selected one or more fields for de-anonymization may then be forwarded to the anonymization system 402 for de-anonymization. The anonymization system 402 may then return the de-anonymized data (or original data) back to the receive data parser 704, for further processing. In some embodiments, receive data parser 704 may reassemble the message with the de-anonymized data and forward the de-anonymized message for further processing.

As one skilled in the art appreciates, as previously discussed, the anonymization system 402 of this disclosure may be configured to perform search and sort of the messages stored in a mail server, by appropriately modifying the search request or a sort request. For example, appropriately replacing the original search term with a replacement search term that corresponds to anonymized data representing the original search term.

As yet another example, in some embodiments, a user data may be initially sent to a destination computer or a host cloud, bypassing the anonymization system 402. The destination computer or the host cloud may then send the user data for anonymizaton to the anonymization system 402. For example, some users of hosted storage providers may upload their data directly to a host cloud. In some embodiments, one or more functionality of the anonymization system 402 described in this disclosure may be distributed in the host cloud. In some embodiments, the host cloud or an application may send the user data for anonymization by the anonymization system 402 of this disclosure. As previously disclosed, the anonymization system may be configured to identify one or more requests of this type. For example, the transmit data parser 702 may be configured to recognize request of this type. The anonymization strategy module 408 may be appropriately configured to handle one or more request of this type.

In some embodiments, the user data after anonymization may be accessed directly, without passing the request through the anonymization system 402. In some of these situations, it may be difficult for a user to perform search and the like on the anonymized data stored in the host cloud. In one embodiment, the transmit data parser 702 may be configured to selectively scan the user data and anonymize selective fields of data within the user data. For example, if the user data is an unstructured data, then, the anonymization system may be configured to identify one or more data fields contained in the user data that may be selectively anonymized. For example, a user data may be an attachment that may be scanned by the anonymization system to identify one or more fields for anonymization.

In some embodiments, one or more fields may be identified by comparing the signature of the data in the field to a know set of signature. As an example, sensitive information like a credit card information, social security identification number information may follow a certain format, which may be used to generate a unique signature pattern for matching. Then, one or more identified fields may be selectively anonymized, based on the anonymization strategy applicable to those one or more identified fields.

In some embodiments, one or more fields of the user data may be selectively identified and those fields may be anonymized and attached as one or more additional fields or a separate file may be created with those selectively identified fields. These additional fields or the separate file may be linked to the user data. In some embodiments, the user data may then be anonymized, without retaining a search or a sort capability. However, the selective additional fields or the separate file may anonymized, yet retaining a search or a sort capability.

In yet another embodiment, selective fields or information within a user data may be anonymized, yet retaining other information within the user data may not be anonymized. As one skilled in the art appreciates, a partial search capability may be permitted, without accessing the user data stored in a destination computing device through the anonymization system 402.

As yet another example, the anonymization module 408 may be configured to perform certain functions prior to the anonymization of one or more fields. As an example, the anonymization module 408 may evaluate one or more of the fields of the data to be transmitted to determine the type of information contained in the field. In some embodiments, the anonymization module 408 may determine whether one or more fields have structured data (like a data field) or an unstructured data (like an attachment.). As an example, the anonymization module 408 may determine that one or more fields have an attachment. For example, the attachment may be a file, an image, an executable code and the like. In some embodiments, the anonymization module 408 may be configured to perform different functions on the data contained in a field, based on the type of data contained in the field. In some embodiments, different functions to be performed on the data contained in a field may be configured in the anonymization strategy module 406.

As one example, if the anonymization module 408 determines that one of the fields has an attachment, the anonymization strategy module 408 may indicate that the file attachment needs to be scanned for malicious code (or malware), prior to processing the data in the field. Based on this indication, the anonymization module 408 may pass the attachment for scanning by a malware detection program. In some embodiments, the malware detection program may be part of the anonymization system 402. In some embodiments, the malware detection program may be a program executed separate from the anonymization system and configured to communicate with the anonymization system 402.

In some embodiments, the anonymization strategy module 408 may be configured to indicate that a malware scan be performed on structured data fields as well. In some embodiments, the anonymization strategy module 408 may be configured to indicate that a malware scan be performed based on one or more attributes of the data contained in a field. For example, malware scan may be selectively performed based on the size of the attachment file, type of attachment file, value of the structured data field and the like.

The malware detection program may scan the data contained in the selected field, for example, an attachment, for malware. After the scan, the malware detection program return the result to the anonymization module 408. In some embodiments, the malware detection program may be configured to "clean" or "remove" a portion of the attachment containing the malicious code. In some embodiments, the malware detection program may just indicate the presence or absence of the malicious code. In some embodiments, the malware detection program may quarantine the attachment for further review. Based on the result from the malware detection program, the anonymization module 408 may be configured to further process the data to be sent to the host cloud or send an error message to the user.

As yet another example, the anonymization strategy module 406 may be configured to indicate a redirect of the data contained in a field to one or more host clouds, based on the attributes of data contained in a field. As an example, some host clouds may be suitable for storing structured data and some host clouds may be suitable for storing unstructured data, like an attachment. In yet another embodiments, it may be desirable to store some type of data in a host cloud based on one or more attributes of the host cloud. The attributes of a cloud may be one or more of location, security, redundancy, cost etc.

Based on the attributes of the data contained in one or more fields, the anonymization strategy module 406 may indicate to the anonymization module 408 to treat the data fields differently. In one embodiment, the anonymization module 408 may store certain fields of data in one host cloud and certain other fields of data in another host cloud. The anonymization module 408 may be configured to assemble more than one message to send the received data from a user computer, to a destination computer.

In some embodiments, the anonymization module 408 may add one or more indicator field in the assembled message to indicate that data is stored in more than one host location. In some embodiments, the indicator field may contain sufficient information to retrieve data from more than one host location, assemble the retrieved data and return the assembled data to a user computer. In some embodiments, the de-anonymization module 410 may be configured to decipher the indicator field to retrieve data from more than one host location.

In some embodiments, the anonymization strategy module 406 may contain sufficient information to permit the anonymization system 402 to generate multiple requests to retrieve data from more than one host cloud. This information may be used by the de-anonymization module 410 to receive data from more than one host cloud and assemble the received data as a single message back to a user.

As one skilled in the art appreciates, the anonymization system 402 may be configured to evaluate more than one field to determine an appropriate anonymization strategy. As an example, a data field may be assigned to indicate groups of users, with different privileges. Then, based on the value contained in the data field indicative of the group, one or more different anonymization strategies can be configured in the anonymization strategy module 406. For example, various privileges like access privilege, use privilege etc may be configured based on the privileges set for the group. For example, an anonymization strategy may be configured where users from some groups may be authorized to send or view attachments and users from some groups may not be authorized to send or view attachments. In yet another embodiments, all fields or selective fields are anonymized based on the group a user belongs etc. It yet another embodiment, anonymization may be performed based on the value of data in a field, for example, anonymizing a field, if the value of the data in the field is greater than a certain amount.

As one skilled in the art appreciates, similar selective de-anonymization strategy may be implemented as well. As an example, if a request for data comes from a user from a certain group or location, based on the stored anonymization strategy, one or more data fields may not be de-anonymized.

As previously discussed, portions of the anonymization system 402 may be distributed. As another example, one or more functionality of the anonymization system 402 may be distributed or duplicated in a separate infrastructure, for example, a host cloud. Now, referring to FIG. 7C, an example distributed anonymization system 710 will be described. The distributed anonymization system includes a master anonymization system 712 and a slave anonymization system 714. The master anonymization system 712 may be similar to the anonymization system 402. The slave anonymization system 714 may also be similar to the anonymization system 402. In some example implementations, both master anonymization system 712 and slave anonymization system 714 may have access to a data store 716, for example, over network 718. Anonymized data may be stored in the data store 716. Anonymized data may be retrieved from the data store 716. Data store 716 may be part of a destination computing device 715. The destination computing device 715 may be located in a host cloud. In some example implementations, the operation of the slave anonymization system 714 may be coordinated in communication with the master anonymization system 712.

Master anonymization system 712 in one embodiment may be similar to anonymization system 402 and includes a management console module 404, an anonymization strategy module 406, anonymization module 408, de-anonymization module 410, tokenization module 412 and one or more crypto modules, shown as crypto 1 module 416, crypto 2 module 418 and crypto N module 420. Additionally, a token vault 414 may also part of the master anonymization system 712. As one skilled in the art appreciates, various modules referenced in this disclosure may be implemented in hardware, software executed on a computing device or a combination of hardware and software. Additionally, various modules may be implemented as an integrated unit or may be implemented as separate functional units that interact with each other using a communication protocol. The master anonymization system 712 further includes a master manager 720.

The slave anonymization system 714 includes slave manager 722, slave request manager 706, one or more function modules FM1 724, FM2 726 and FMn 728 and configuration module 730. Example functions, features and operation of slave anonymization system 714 will now be described.

Slave request manager 706 is configured to receive requests from a user system and process the request. As one skilled in the art appreciates, in some embodiments, requests from a user computer may be initially received by the slave anonymization system 714, instead of the master anonymization system 712. In some embodiments, transmit data parser 702 and receive data parser 704 may be part of slave request manager 706. Slave request manager 706 may selectively use the functions and features of transmit data parser 702 and receive data parser 704, based on the type of request, as previously described. As an example, slave request manager 706 may selectively use the functions and features of transmit data parser 702, if a request is to store data in the data store 716. As another example, slave request manager 706 may selectively use the functions and features of receive data parser 704, if a request is to retrieve data stored in the data store 716.

Slave manager 722 is configured to communicate with master manager 720 of master anonymization system 712. When slave anonymization system 714 is initialized, the slave manager 722 communicates with the master manager 720. Communication sent from the slave manager 722 initiates an authentication process, whereby the master anonymization system 712 authenticates the slave anonymization system 714. Authentication process may include one or more of verifying identifying token for the slave anonymization system 712, receiving a user name and password for authentication and the like.

In some examples, slave anonymization system 714 may be running in a computing environment, details of which may have to be communicated to the master anonymization system 712. In some examples, slave anonymization system 714 may send one or more authentication tokens. Some of the authentication tokens may include information about the computing environment. For example, information contained in a token may include one or more of hardware platform details, operating system details, version numbers of various software modules, network location and programming language runtime module details and their version numbers etc. In some examples, slave anonymization system 714 may transmit one or more digital signatures of various components of the system for validation. One or more of these digital signatures may be used by the master anonymization system 712 to validate the authenticity of various components of the system and confirm that slave anonymization system 714 has not been compromised.

Master anonymization system 712 may periodically validate the authenticity of various components of the system and confirm that slave anonymization system 714 has not been compromised. As an example, master anonymization system 712 may validate the authenticity of various components of the system prior to execution of one or more function modules FM1 724, FM2 726 and FMn 728.

Once the slave anonymization system 714 is authenticated by the master anonymization system 712, master anomymization system 712 communicates with the slave manager 722 to configure various functional attributes authorized to be performed by the slave anonymization system 714. In one example, configuration module 730 stores various functional attributes authorized to be performed by the slave anonymization system 714. As one skilled in the art appreciates, configuration module 730 may store various functional attributes authorized to be performed in a permitted function table 732, sometimes referred to as PF table 732.

For example, in some embodiments, the slave anonymization system 714 may only be authorized to respond with an aggregate data, for example, number of records with a field data having a particular state, or an area code and the like. In some embodiments, slave anonymization system 714 may be permitted to perform a translation of data that was not anonymized. For example, if a file is stored in one format, with one or more data within the file anonymized, the slave anonymization system 714 may be permitted to translate the file to another format, however, retaining one or more anonymized data in their anonymized form. In some embodiments, slave anonymization system 714 may only be permitted to perform mathematical manipulation of data stored in an anonymized form. For example, finding an average for a field containing invoice amount, revenue by invoice or revenue by customer and the like. In such an example, the slave anonymization system 714 may be permitted to extract the appropriate data, de-anonymize the data, perform the mathematical manipulation and return the result as a response to a query.

FIG. 7D shows an example permitted function table 732. Example permitted function table 732 is for various data fields for server application SA0. As one skilled in the art appreciates, the permitted functions of the slave anonymization system may be stored in other forms other than a table form. Column 734 shows various data fields of server application SA0. In one example, the data fields shown may correspond to the data fields shown with respect to table 500 in FIG. 500, for application SA0. Each of the rows of table 732 shows the data field and their corresponding permitted functions. As an example, Column 736 shows whether anonymization of data in a data field is permitted. Column 738 shows whether de-anonymization of data in a data field is permitted. Column 740 shows whether selective de-anonymization is permitted for data in a data field. Column 742 shows function module assigned to perform the permitted function.

Now, referring to row 744, for DATA FIELD 1, both anonymization and de-anonymization functions are permitted to be performed by the slave anonymization system 714. Corresponding function module to perform the function is FM1. Now, referring to table 500 and row 512 of FIG. 5, we notice that DATA FIELD 1 is a numeric field and anonymization strategy used to anonymize DATA FIELD 1 is TPF1. So, function module FM1 may be configured to perform anonymization and de-anonymization of data in DATA FIELD 1 using anonymization strategy TPF1. Function module FM1 may be configured to perform the functions of crypto engine that corresponds to anonymization strategy TPF1.

Now, referring to row 746, for DATA FIELD 4, neither anonymization nor deanomymization is permitted. However, referring to column 740, selective de-anonymization of DATA FIELD 4 is permitted, for example, to generate aggregate value. Now, referring to table 500 and row 514 of FIG. 5, we notice that DATA FIELD 4 is an alphabetic field and anonymization strategy used to anonymize DATA FIELD 4 is TPF4. So, function module FM2 may be configured to perform de-anonymization of data in DATA FIELD 4 using anonymization strategy TPF4. Function module FM2 may be configured to perform the functions of crypto engine that corresponds to anonymization strategy TPF4. As the permitted function for DATA FIELD 4 is a selective de-anonymization to generate aggregate value only, the slave anonymization system 714 will use the de-anonymized data stored in DATA FIELD 4 to generate only aggregate value. For example, generating a result that indicates number of records of DATA FIELD 4 that contain same value.

Now, referring to row 748, for DATA FIELD 7, neither anonymization nor deanomymization is permitted. However, referring to column 740, selective de-anonymization of DATA FIELD 7 is permitted, for example, to generate aggregate value. Now, referring to table 500 of FIG. 5 and row that corresponds to DATA FIELD 7, we notice that DATA FIELD 7 is a numeric field and anonymization strategy used to anonymize DATA FIELD 7 is TPF6. So, function module FMn may be configured to perform de-anonymization of data in DATA FIELD 7 using anonymization strategy TPF6. Function module FMn may be configured to perform the functions of crypto engine that corresponds to anonymization strategy TPF6. As the permitted function for DATA FIELD 7 is a selective de-anonymization to generate aggregate value only, the slave anonymization system 714 will use the de-anonymized data stored in DATA FIELD 7 to generate only aggregate value. For example, if DATA FIELD 7 corresponds to a value indicative of revenue generated from a customer, in one example, a mathematical operation may be performed to generate average of result that indicates average revenue generated from all the customers. In another example, a mathematical operation may be performed to generate a total value for revenue generated from all the customers.

Now, referring to row 750, for DATA FIELD 3, neither anonymization nor deanomymization is permitted. Further, referring to column 740, selective de-anonymization is also not permitted. In this example, request for performing any operation for DATA FIELD 3 will be referred to the master anonymization system 712.

Now, referring back to FIG. 7C, slave request manager 706 may be configured to receive communication from a user. The communication received may require storing data in the data store 716 or retrieve data from the data store 716. In some examples, communication received may require anonymization of data in a data field. In some examples, communication received may require de-anonymization of data in a data field, for example, data stored in the data store. In some examples, the communication received may require a mathematical operation on data stored in the data store. For example, counting the number of records with a specific data, as an example, a field data indicative of a state, city, country and the like. In some examples, the communication received may require translation of data stored in the data store. For example, converting the data stored in one format to another format. In some embodiments, the communication received may require performing search or sort on the data stored in the data store.

Slave request manager 706 evaluates the request and verifies if the requested operation is permitted to be performed by the slave anonymization system 714. As an example, the slave request manager 706 may verify if the operation to be performed is permitted by checking the permitted function table 732. In some embodiments, slave request manager 706 may communicate with the configuration manager 730 to verify if the operation to be performed is permitted. In some embodiments, the slave request manager 706 may communicate with the slave manager 722, which in turn, may communicate with the configuration manager 730 to verify if the operation to be performed is permitted. Configuration manager 730 may verify appropriate permitted function table 732 to verify if the operation to be performed is permitted.

If the operation to be performed is not permitted, the request is forwarded to the master anonymization system 712. For example, the slave manager 722 may forward the request to the master anonymization system 712 for further processing. The master anonymization system 712 performs the requested operation and returns the result to the slave manager 722. Slave manager 722 forwards the result to the slave request manager 706 for further processing. The slave request manager 706 returns the result to the user.

If the operation to be performed is permitted, the slave request manager 706 requests assignment of one of the function modules (for example, one of the function modules FM1 724, FM2 726 or FMn 728) to perform the operation. The slave request manager 706 may request slave manager 722 to assign one of the function modules to perform the operation. In some embodiments, function modules, for example, modules FM1, FM2 and FMn may be configured to perform a specific operation. One of the function module that can perform the requested operation is enabled and the requested operation is performed. The results of the operation is forwarded to the slave request manager 706 for further processing. In some embodiments, Slave manager 722 may receive the results of the operation, which is then forwarded to the slave request manager 706 for further processing. The slave request manager 706 returns the result to the user. In some embodiments, slave request manager 706 may receive the results of the operation, which may be further forwarded to the receive data parser 704 for further processing. As previously discussed, the receive data parser 704 may appropriately assemble the results prior to returning the results to the user computer.

In some embodiments, the function modules FM1, FM2 and FMn may be configured to perform a specific operation, only for a limited period of time, after which the operation of the function module is disabled. As an example, a file or computer code to be executed by the function module FM1, FM2 and FMn may have an indicator that enables the function module to operate only for a limited period of time. In some embodiments, after the expiry of the limited period of time, the function module may be configured to make one or more computer code to be disabled or deleted, so that the function module becomes inoperative.

In some embodiments, the function modules FM1, FM2 and FMn may only operate in collaboration with the master anonymization system 712. For example, master anonymization system 712 may have to enable the operation of the modules FM1, FM2 and FMn, by providing one or more signals. These signals may be keys, files or other mechanisms which permit the operation of the modules FM1, FM2 and FMn. As another example, the signal may enable an indicator that permits the operation of the function module. In yet another example, operation of the modules FM1, FM2 and FMn may involve subsequent communication with the master anonymization system 712. Subsequent communication with the master anonymization system 712 may require some or all of the operations to be performed by the master anonymization system 712. The master anonymization system 712 may return the results of the operation to the modules for further processing.

Figure 8A:
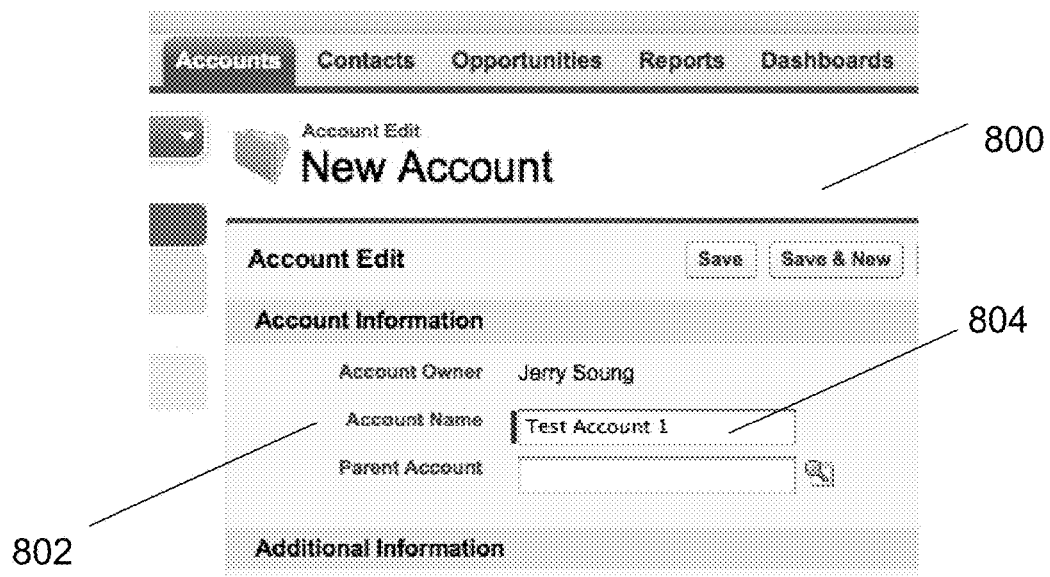

Now referring to FIGS. 8A-8C and FIGS. 9A-9C an exemplary anonymization implementation will be described. Referring to FIG. 8A, a screen shot 800 presented on a user computer to open a new account for an application running on a hosted cloud is shown. More specifically, the data field 802 refers to the Account Name and the corresponding data for the Account Name is entered in the form field 804. For example, the Account Name entered is "Test Account 1".

FIG. 8B shows the "POST" action data as transmitted to the hosted cloud, without anonymization. More specifically, reference numeral 804-1 shows the post data that corresponds to the Account Name. As one skilled in the art appreciates, it is not difficult to ascertain the Account Name as "Test Account 1".

FIG. 8C shows the "POST" data as transmitted to the host cloud, with an embodiment of the anonymization technique described in this disclosure. More specifically, reference numeral 804-2 shows the anonymized data that corresponds to the Account Name. FIG. 8D shows various parts of the anonymized data.

Referring to FIG. 8D, the anonymized data 804-2 includes two anonymized data fields 804-21 and 804-22. The first data field 804-21 corresponds to the word "Test" and the second data field 804-22 corresponds to the word "Account". Additionally, the preamble 806 for the first data field is TPF1. The postamble 808 for the first data field is 1TSF. Similarly, the preamble 810 for the second data field is TPF1 and the postamble 812 for the second data field is 1TSF1.

Figure 9A:
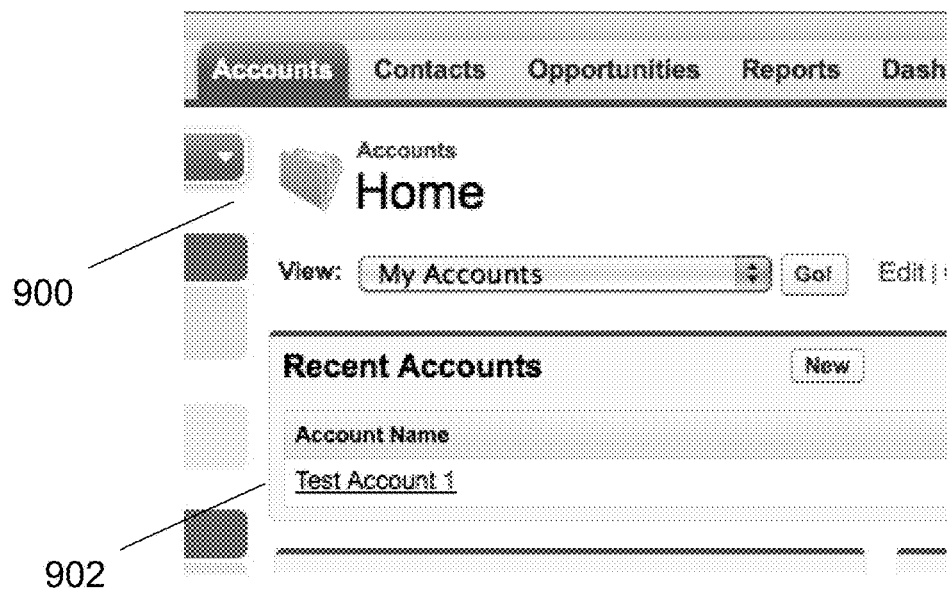
FIGS. 9A-9C shows exemplary de-anomymization of data received from the destination computing device.

Now, referring to FIG. 9A, a screen shot 900 presented on a user computer to view accounts set up for an application running on a hosted cloud is shown. More specifically, the screen shot 900 shows the list of account names that have been set up, for example, account name 902 referring to Test Account 1 that is received in response to a GET action initiated by the user computer to the application hosted on the hosted cloud.

Figures 9B, 9C:
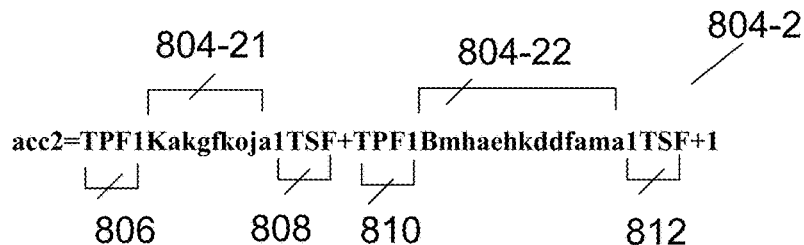

FIG. 9B shows the HTML code 904 constructed by the application hosted on the hosted cloud in response to the GET action. More specifically, the anonymized values 906 of the account name is returned in the HTML code 904. The anonymized value 906 corresponds to the anonymized data 904-2.

FIG. 9C shows the HTML code 908 constructed after processing the received HTML code 904 from the hosted cloud and de-anonymize the anonymized data field 906. More specifically, the HTML code 908 includes the de-anonymized value as shown in data field 910. The HTML code 908 with de-anonymized value for Account Name data field is sent to the user computer, in response to the GET action initiated by the user computer.

Figure 10:
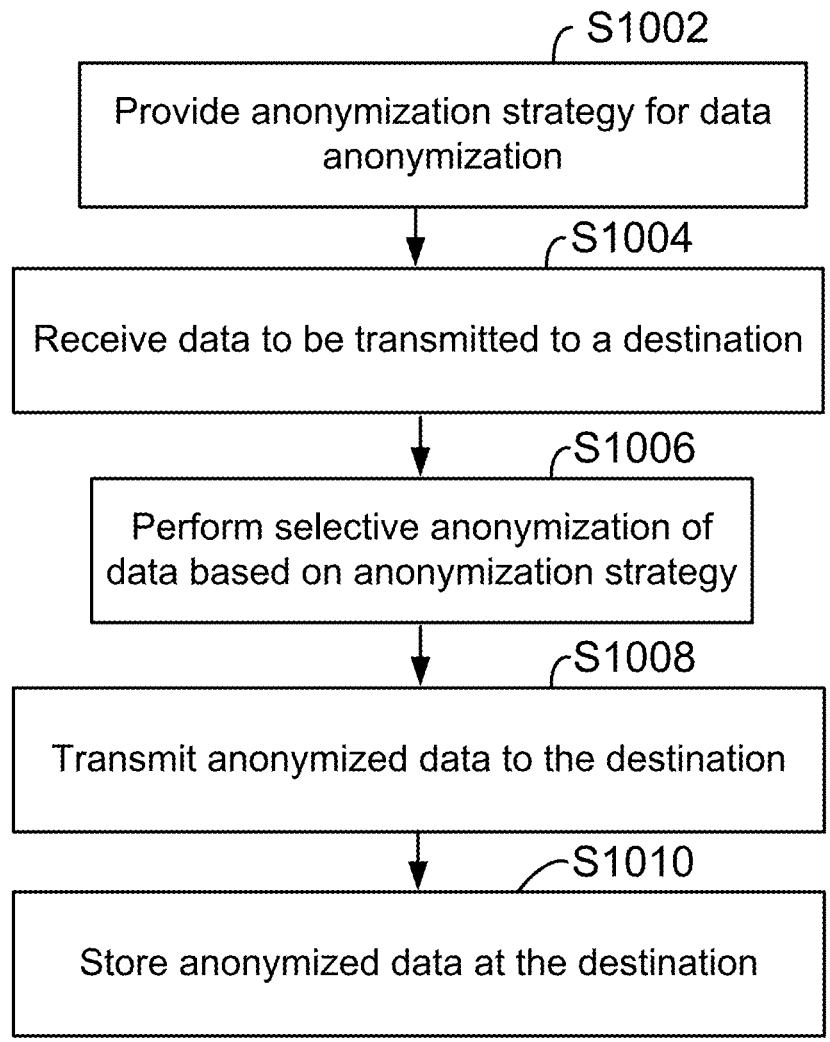
FIG. 10 shows method of anonymizing data to be transmitted to a destination computing, according to one aspect of the present disclosure.

Now, referring to FIG. 10, a method of anonymization of data to be transmitted to a hosted cloud is described. In block S1002, an anonymization strategy for data anonymization is provided. In one embodiment, the anonymization strategy is stored in a anonymization strategy module 406. In one embodiment, a management console module 404 may query applications running on the hosted cloud and present and receive meta data (or data schema, data definitions) of each application. The management console module 404 may present the available anonymization strategies for each data field of the meta data to the user computer. The user may select one or more of the anonymization strategies to be applied to various data fields of the application.

The selected anonymization strategy is stored by the management console module 404 in the anonymization strategy module 406, for later use by other modules of the anonymization system 402. The anonymization strategy may be stored as a table in the anonymization strategy module 406. The anonymization strategy in one embodiment may include schema definition for data manipulation. An exemplary selected anonymization strategy is described with reference to FIG. 5.

In block S1004 data to be transmitted to a destination is received. In one embodiment, the data to be transmitted to a destination is received by the anonymizaton system from the user computer.

In block S1006, selective anonymization of data based on anonymization strategy is performed. For example, an anonymization strategy may be selected based on the data field and corresponding anonymization strategy, as shown and described with reference to FIG. 5. An exemplary anonymization of data may be performed, as described with reference to FIGS. 8A-8D.

In block S1008, the anonymized data is transmitted to the destination. In one embodiment, the anonymized data is transmitted to the application running on the hosted cloud. An exemplary transmission of anonymized data was at least described with reference to FIGS. 8A-8D.

In block S1010, the anonymized data is stored in the destination. For example, the anonymized data may be stored in a database coupled to an application server, as shown in FIG. 3.

Figure 11A:
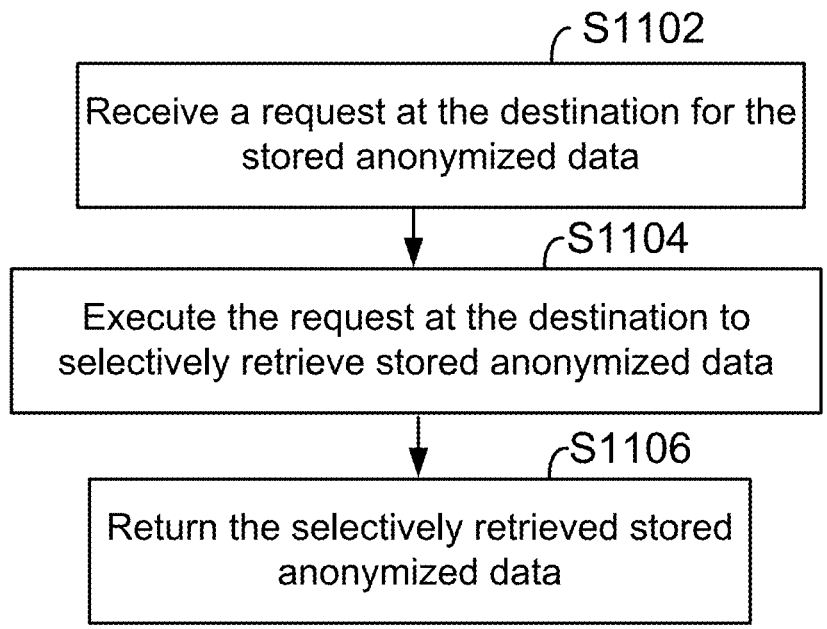
FIG. 11A shows method of processing a request for stored anonymized data by the destination computing device.

Now referring to FIG. 11A, an exemplary method of processing a request at the destination is described. In block S1102, a request for the stored anonymized data is received at the destination. For example, as described with reference to FIGS. 9A-9C, a GET action request is received at the application running on a hosted cloud.

In block S1104, the request is executed at the destination to selectively retrieve stored anonymized data. As an example, the application server running on the hosted cloud processes the GET action and retrieve anonymized data corresponding to the GET action from a user computer.

In block S1106, the selectively retrieved stored anonymized data is returned. As an example, the application running on the hosted cloud assembles a response to the GET action and returns the selectively retrieved stored anonymized data, as shown in FIG. 9B.

Figure 11B:
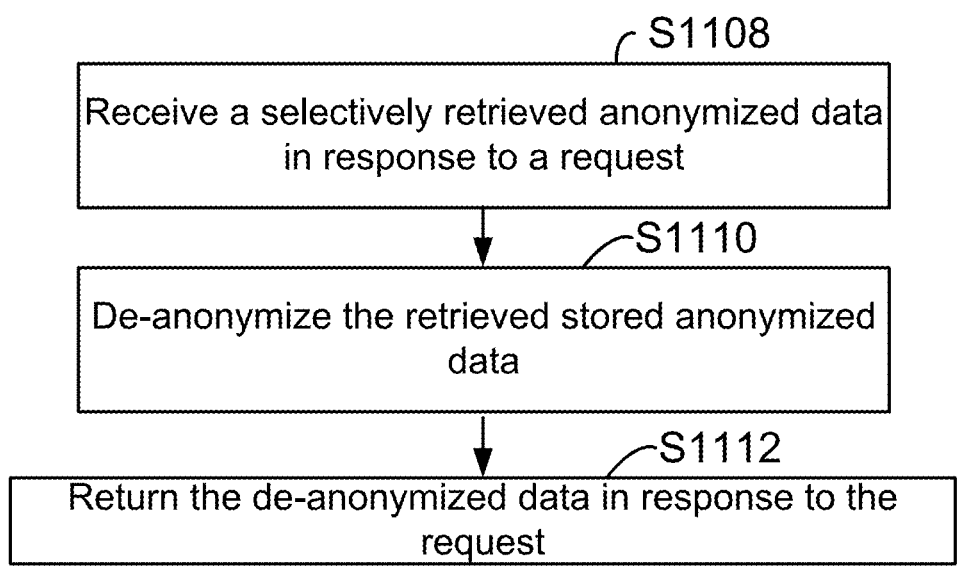
FIG. 11B shows method of processing selectively retrieved anonymized data from the destination computing device.

Now referring to FIG. 11B, an exemplary method or processing a response to a request is described. In block S1108, a selectively retrieved anonymized data is response to a request is received. As an example, a response from the hosted cloud to a GET action is received by the anonymization system 402. The response may be a HTTP response as shown in FIG. 9B.

In block S1110, the retrieved stored anonymized data is de-anonymized. For example, the retrieved anonymized data is evaluated by the de-anonymization module 410. The selective preamble contained in the anonymized data is identified. The de-anonymization module performs the de-anonymization based on the identified preamble and generates the de-anonymized data. An exemplary de-anonymized data is shown in FIG. 9C.

In block S1112, the de-anonymized data is returned in response to the request. For example, an HTTP response as described with reference to FIG. 9C is returned to the user computer.

As it is apparent to one skilled in the art, data transfers from user applications are selectively anonymized using one or more anonymization techniques, based on selected anonymization strategy. The anonymization of data happens transparently to the user application.

Although in some embodiments, anonymization techniques may have be described with reference to encryption of the input word, these techniques may be adapted and practiced using tokenization as well.

Although in this disclosure reference is made to transmitting anonymized data to a hosted cloud or a destination system located at a third party location, the disclosure is not limited to the disclosed embodiments. In some embodiments, anonymized data may be stored in a user cloud itself. The server application may be any type of application, including word processing applications, mail applications and the like.

Although the hosted cloud has been described with one or more servers and databases, these clouds may be implemented with additional servers and databases that may act as redundant systems or cumulative systems.

As one skilled in the art appreciates, various embodiments of this disclosure may provide one or more of the following benefits. For example, anonymization of transmitted data may occur transparent to the user application. Anonymized data may be sortable, based on the selected anonymization strategy. Anonymized data may be searchable, based on the selected anonymization strategy. Anonymized data may be subjected to case-insensitive search, based on the selected anonymization strategy. Portions of a data field may be anonymized, retaining other portion of the data field in its original form. Portions of the data field retained in its original form may be bypassed from the anonymization process and system, which may lead to improved overall performance of the anonymization system.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for anonymizing data to be stored in a destination computing device, comprising:

receiving data to be stored in the destination computing device from a user computer;
providing a communication link between a master anonymization system and a slave anonymization system, wherein the master anonymization system configured to perform selective anonymization of the received data and wherein the slave anonymization system configured to perform selective anonymization of the received data, if permitted;
permitting slave anonymization system to perform one or more functions, permitting enabled by the master anonymization system;
receiving data to be stored by the slave anonymization system, the data including a plurality of fields of data;
selecting one or more fields of data for anonymization by the slave anonymization system;
verifying if anonymizing one or more selected fields of data is a permitted function of the slave anonymization system;
anonymizing the selected one or more fields of data by the slave anonymization system, if permitted;
transmitting data with anonymized one or more fields of data, to the destination computing device for storage in the destination computing device;
receiving a selectively retrieved anonymized data by the slave anonymization system in response to a request;
de-anonymizing the retrieved anonymized data by the slave anonymization system; and
returning the de-anonymized data by the slave anonymization system, in response to the request.

2. The method of claim 1, wherein if anonymizing the selected one or more fields of data is not a permitted function of the slave anonymization system, sending received data to be stored in the destination computer to the master anonymization system for anonymization.

3. The method of claim 1, wherein anonymizing the selected one or more fields of data further including,
requesting assignment of a function module by the slave anonymization system to perform the permitted function; and
performing the anonymization by the slave anonymization system using the assigned function module.

4. The method of claim 3, wherein the assigned function module of the slave anonymization system communicates with the master anonymization system to perform the anonymization.

5. The method of claim 1, wherein selecting one or more fields further including:
determining a format for the received data by a transmit data parser executed in the slave anonymization system; and
identifying one or more fields of data based on determined format by the transmit data parser.

6. The method of claim 5, wherein the format for the received data indicates a message to a database.

7. The method of claim 5, wherein the format for the received data indicates an email message.

8. The method of claim 1, further including:
determining a value of a field of data; and
determining a type of anonymization for the data, based on the value of the field of data.

9. The method of claim 1, further including:
determining a type of a field of data; and
determining a type of anonymization for the data, based on the type of the field of data.

10. The method of claim 8, further including scanning the data in the field of data for malware, based on the value of the field of data.

11. The method of claim 9, further including scanning the data in the field of data for malware, based on the type of the field of data.

12. The method of claim 8, wherein the value of the field of data is indicative of a selective group and a set of anonymization strategy associated with the selective group is selected for anonymization.

13. The method of claim 9, wherein determining the type of anonymization further including selecting a different destination computing device for storing a portion of the received data.

14. The method of claim 2, further including
receiving data with anonymized one or more fields of data from the destination computing device; and
de-anonymizing the received data with anonymized one or more fields of data by the master anonymization system.

15. An anonymization system to anonymize data to be stored in a destination computing device, comprising:
a master anonymization system executed on a computing device and configured to perform selective anonymization of the data received from a user computer for storage in the destination computing device;
a slave anonymization system configured to communicate with the master anonymization system, the slave anonymization system configured to perform selective anonymization of the received data, wherein the master anonymization system selectively permits the slave anonymization system to perform one or more functions,
wherein the slave anonymization system is configured to
receive data to be stored in the destination computing device, the data including a plurality of fields of data;
select one or more fields of data for anonymization;
verify if anonymization of one or more selected fields of data is a permitted function of the slave anonymization system;
anonymize the selected one or more fields of data by the slave anonymization system if permitted;
transmit data with anonymized one or more fields of data, to the destination computing device for storage in the destination computing device: and
wherein the slave anonymization system further configured to receive a selectively retrieved anonymized data in response to a request;
de-anonymize the retrieved anonymized data; and
return the de-anonymized data, in response to the request.

16. The system of claim 15, wherein if anonymization of the selected one or more fields of data is not a permitted function of the slave anonymization system, received data to be stored in the destination computer is sent to the master anonymization system for anonymization.

17. The system of claim 15, further including,
slave anonymization system requests assignment of a function module from the master anonymization system to perform the permitted function; and
perform the anonymization using the assigned function module.

18. The system of claim 17, wherein the assigned function module of the slave anonymization system communicates with the master anonymization system to perform the anonymization.

19. The system of claim 15, wherein the slave anonymization system is configured to determine a format for the received data by a transmit data parser executed in the slave anonymization system; and
- identify one or more fields of data based on the determined format by the transmit data parser.

20. The system of claim 15, wherein
the slave anonymization system is configured to
determine a value of a field of data; and
determine a type of anonymization for the data, based on the value of the field of data.

21. The system of claim 15, wherein
the slave anonymization system is configured to
determine a type of a field of data; and
determine a type of anonymization for the data, based on the type of the field of data.

22. The system of claim 20, wherein, based on the value of the field of data, the data in the field of data is selectively scanned for malware by a malware detection program.

23. The system of claim 20, wherein the value of the field of data is indicative of a selective group and a set of anonymization strategy associated with the selective group is selected for anonymization.

24. The system of claim 21, wherein the slave anonymization system selects a different destination computing device to store a portion of the received data, based on the type of the field of data.

25. The system of claim 16, wherein the master anonymization system further configured to receive a selectively retrieved anonymized data in response to a request;

de-anonymize the retrieved anonymized data; and return the de-anonymized data, in response to the request.

26. The system of claim 15, wherein the anonymized data is configured to be searchable using anonymized keyword.

* * * * *